US011308461B2

(12) United States Patent
Haldenby et al.

(10) Patent No.: US 11,308,461 B2
(45) Date of Patent: Apr. 19, 2022

(54) SYSTEMS AND METHODS FOR TRACKING AND TRANSFERRING OWNERSHIP OF CONNECTED DEVICES USING BLOCKCHAIN LEDGERS

(71) Applicant: The Toronto-Dominion Bank, Mississauga (CA)

(72) Inventors: Perry Aaron Jones Haldenby, Mississauga (CA); Rajan Mahadevan, Mississauga (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1362 days.

(21) Appl. No.: 14/936,833

(22) Filed: Nov. 10, 2015

(65) Prior Publication Data

US 2017/0046664 A1 Feb. 16, 2017

Related U.S. Application Data

(60) Provisional application No. 62/204,768, filed on Aug. 13, 2015.

(51) Int. Cl.
*G06Q 20/06* (2012.01)
*G06Q 20/36* (2012.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
CPC ....... G06Q 10/0631; G06Q 10/063114; G06Q 10/08; G06Q 10/103; G06Q 10/1097;
(Continued)

(56) References Cited

U.S. PATENT DOCUMENTS 7,703,140 B2    8/2010    Nath et al.
8,135,134 B2    3/2012    Orsini et al.
(Continued)

FOREIGN PATENT DOCUMENTS

WO    WO 2001/029777    2/2015

OTHER PUBLICATIONS

Herbert et al., "A Novel Method for Decentralised Peer-to-Peer Software License Validation Using Cryptocurrency Blockchain Technology," Proceedings of the 38th Australian Computer Science Conference, Jan. 27-30, 2015, pp, 27-35.
(Continued)

*Primary Examiner* — John W Hayes
*Assistant Examiner* — Ari Shahabi
(74) *Attorney, Agent, or Firm* — Duane Morris LLP

(57) ABSTRACT

The disclosed embodiments include computerized systems and methods that generate secured blockchain-based ledger structures that facilitate event-based control of tracked assets. In one embodiment, an apparatus associated with a centralized authority of the secured blockchain-based ledger may detect an occurrence of an event, and may access and decrypt a set of rules hashed into the secured blockchain-based ledger using a confidentially-held master cryptographic key. The apparatus may identify a rule associated with the detected event, and perform one or more operations consistent with the rule and involving at least one of assets tracked within the secured blockchain-based ledger or an owner of a portion of the tracked assets. By way of example, the detected event may triggering a sale, transfer, and/or (Continued)

re-allocation of an ownership interest in a tracked asset, and the identified rule may specify a distribution of proceeds derived from the sale, transfer, and/or re-allocation.

23 Claims, 8 Drawing Sheets

(51) Int. Cl.
*G06Q 10/06* (2012.01)
*G06Q 10/10* (2012.01)
*G06Q 50/08* (2012.01)
*G06Q 20/10* (2012.01)
*G06Q 20/40* (2012.01)
*G06Q 50/18* (2012.01)
*G06Q 10/08* (2012.01)
*G06Q 30/02* (2012.01)
*G06Q 40/00* (2012.01)
*G06Q 40/08* (2012.01)
*G06Q 20/38* (2012.01)
*G06F 21/64* (2013.01)
*H04N 5/913* (2006.01)
*G06F 21/62* (2013.01)
*H04L 9/08* (2006.01)
*H04L 9/32* (2006.01)
*H04L 29/06* (2006.01)

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/80* (2015.11); *Y04S 10/50* (2013.01)

(58) Field of Classification Search
CPC ............. G06Q 20/0655; G06Q 20/065; G06Q 20/102; G06Q 20/367; G06Q 20/3829; G06Q 20/401; G06Q 20/4016; G06Q 20/405; G06Q 40/128; G06Q 30/0214; G06Q 40/08; G06Q 50/08; G06Q 50/18; G06Q 2220/00; G06Q 2220/10; G06Q 2230/00; G06F 21/62; G06F 21/645; H04L 9/0816; H04L 9/0861; H04L 9/0891; H04L 9/0894; H04L 9/3247; H04L 63/061; H04L 63/062; H04L 63/0876; H04L 63/0435; H04L 63/0442; H04L 63/08; H04L 63/12; H04L 2209/24; H04L 2209/38; H04L 2209/56; H04N 5/913; H04N 2005/91342; Y02P 90/86; Y04S 10/54
See application file for complete search history.

(56) References Cited

U.S. PATENT DOCUMENTS

| | | | |
|---|---|---|---|
| 8,327,138 | B2 | 12/2012 | Nath et al. |
| 8,347,088 | B2 | 1/2013 | Moore et al. |
| 8,651,375 | B1 | 2/2014 | Gouldd et al. |
| 9,014,661 | B2 | 4/2015 | DeCharms |
| 2005/0288963 | A1* | 12/2005 | Parrish .................. G06Q 10/10 705/2 |
| 2011/0106685 | A1 | 5/2011 | Silbert |
| 2014/0344015 | A1 | 11/2014 | Puértolas-Montañés |
| 2015/0046337 | A1 | 2/2015 | Hu et al. |
| 2015/0081566 | A1 | 3/2015 | Slepinin |
| 2015/0128240 | A1 | 5/2015 | Richards et al. |
| 2015/0220892 | A1 | 8/2015 | Allen |
| 2016/0098730 | A1* | 4/2016 | Feeney .............. G06Q 20/3825 705/71 |
| 2016/0259937 | A1* | 9/2016 | Ford ..................... G06F 21/577 |
| 2016/0306982 | A1* | 10/2016 | Seger, II .................. H04L 9/14 |
| 2018/0123790 | A1* | 5/2018 | Itamar ................. G06F 21/6218 |

OTHER PUBLICATIONS

Danezis et al., "Centrally Banked Cryptocurrencies," May 26, 2015 (13 pages).
Noyen et al., "When Money Learns to Fly: Towards Sensing as a Service Applications Using Bitcoin," Sep. 20, 2014 (6 pages).
"Does the creator of BitCoin hold a 'master' private key?" (retrieved from http://bitcoin.stackexchange.com/questions/9417/does-the-creator-of-bitcoin-hold-a-master-private-key), Apr. 9, 2013 (2 pages).

* cited by examiner

SYSTEMS AND METHODS FOR TRACKING AND TRANSFERRING OWNERSHIP OF CONNECTED DEVICES USING BLOCKCHAIN LEDGERS

CROSS-REFERENCE TO RELATED APPLICATIONS

This application claims the benefit of U.S. Provisional Patent Application No. 62/204,768, filed Aug. 13, 2015, which is expressly incorporated by reference herein to its entirety.

TECHNICAL FIELD

The disclosed embodiments generally relate to computerized systems and methods for securing data, and more particularly, and without limitation, computerized systems and methods that generate secured blockchain-based ledger structures that facilitate event-based control of tracked assets.

BACKGROUND

Today, virtual and crypto-currencies, such as Bitcoin™, are gaining acceptance as viable mechanisms for performing purchase transactions and other financial services transactions. The transfer of units of these virtual and crypto-currencies between owners, which is essential to the ultimate success of these virtual and crypto-currencies, relies on a robust blockchain ledger structure that, due to its public nature, redundant verification, and resistance to fraudulent activity, offers advantages over existing centralized server systems. Despite its many advantages, conventional systems exhibit significant flaws, especially when used to track assets in secure, high-risk, and/or sensitive applications.

For instance, many conventional database and ledger-based systems track an evolution in an ownership of tracked assets through entries sequentially generated entries, which may be generated using multiple and often-incompatible software applications. The need to parse through the sequentially generated entries, even for those transactions that follow standardized, event-based rules, may result in a protracted, computationally inefficient analysis of the ownership structure of these tracked assets, which may delay ownership transfers and disbursement of corresponding proceeds.

SUMMARY

The disclosed embodiments relate to computerized systems and methods that generate secured blockchain-based ledger structures that facilitate event-based control of tracked assets.

In an embodiment, an apparatus includes at least one processor and a memory storing executable instructions that, when executed by the at least one processor, causes the at least one processor to perform the step of accessing data corresponding to at least one blockchain ledger. In one aspect, the accessed blockchain ledger data may track a temporal evolution of an ownership of at least one asset. The executed instructions may also cause the at least one processor to perform the step of decrypting (i) a first encrypted portion of the blockchain ledger data using a first cryptographic key and (ii) a second encrypted portion of the blockchain ledger data using a second cryptographic key. In some aspects, the decrypted first data portion may identify a plurality of events controlled by a rules authority, and the decrypted second data portion may identify a plurality of rules associated with the events. The executed instructions may also cause the at least one processor to perform the steps of detecting, based on the decrypted first data portion, an occurrence of a first one of the events that triggers a transfer of an ownership interest in the at least one asset, identifying, based on the decrypted second data portion, at least one of the rules that exhibits a causal relationship with the detected event, and generating an electronic command to perform one or more operations consistent with the at least one identified rule.

In other embodiments, a computer-implemented method may include accessing, using at least one processor, data corresponding to at least one blockchain ledger. In one aspect, the accessed blockchain ledger data may track a temporal evolution of an ownership of at least one asset. Using the at least one processor, the method may decrypt (i) a first encrypted portion of the blockchain ledger data using a first cryptographic key and (ii) a second encrypted portion of the blockchain ledger data using a second cryptographic key. In some aspects, the decrypted first data portion may identify a plurality of events controlled by a rules authority, and the decrypted second data portion may identify a plurality of rules associated with the events. The method may also include detecting, using the at least one processor, and based on the decrypted first data portion, an occurrence of a first one of the events that triggers a transfer of an ownership interest in the at least one asset, identifying, using the at least one processor, and based on the decrypted second data portion, at least one of the rules that exhibits a causal relationship with the detected event, and generating, using the at least one processor, an electronic command to perform one or more operations consistent with the at least one identified rule.

In further embodiments, an apparatus includes at least one processor and a memory storing executable instructions that, when executed by the at least one processor, causes the at least one processor to perform the step of accessing data corresponding to at least one blockchain ledger. In one aspect, the accessed data may track a temporal evolution of an ownership of a connected device. The executed instructions may also cause the at least one processor to perform the step of decrypting (i) a first encrypted portion of the blockchain ledger data using a first cryptographic key and (ii) a second encrypted portion of the blockchain ledger data using a second cryptographic key. In some aspects, the decrypted first data portion may identify a plurality of events controlled by a rules authority, and the decrypted second data portion may identify a plurality of rules associated with the events. The executed instructions may also cause the at least one processor to perform the steps of detecting, based on the decrypted first data portion, an occurrence of at least one event corresponding to a failure of the connected device to establish communications with the apparatus in accordance with an established communications schedule, identifying, based on the decrypted second data portion, at least one reconciliation rule that exhibits a causal relationship with the detected event, and generating an electronic command to perform one or more reconciliation operations consistent with the at least one identified rule.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims

DETAILED DESCRIPTION

Figure 1:
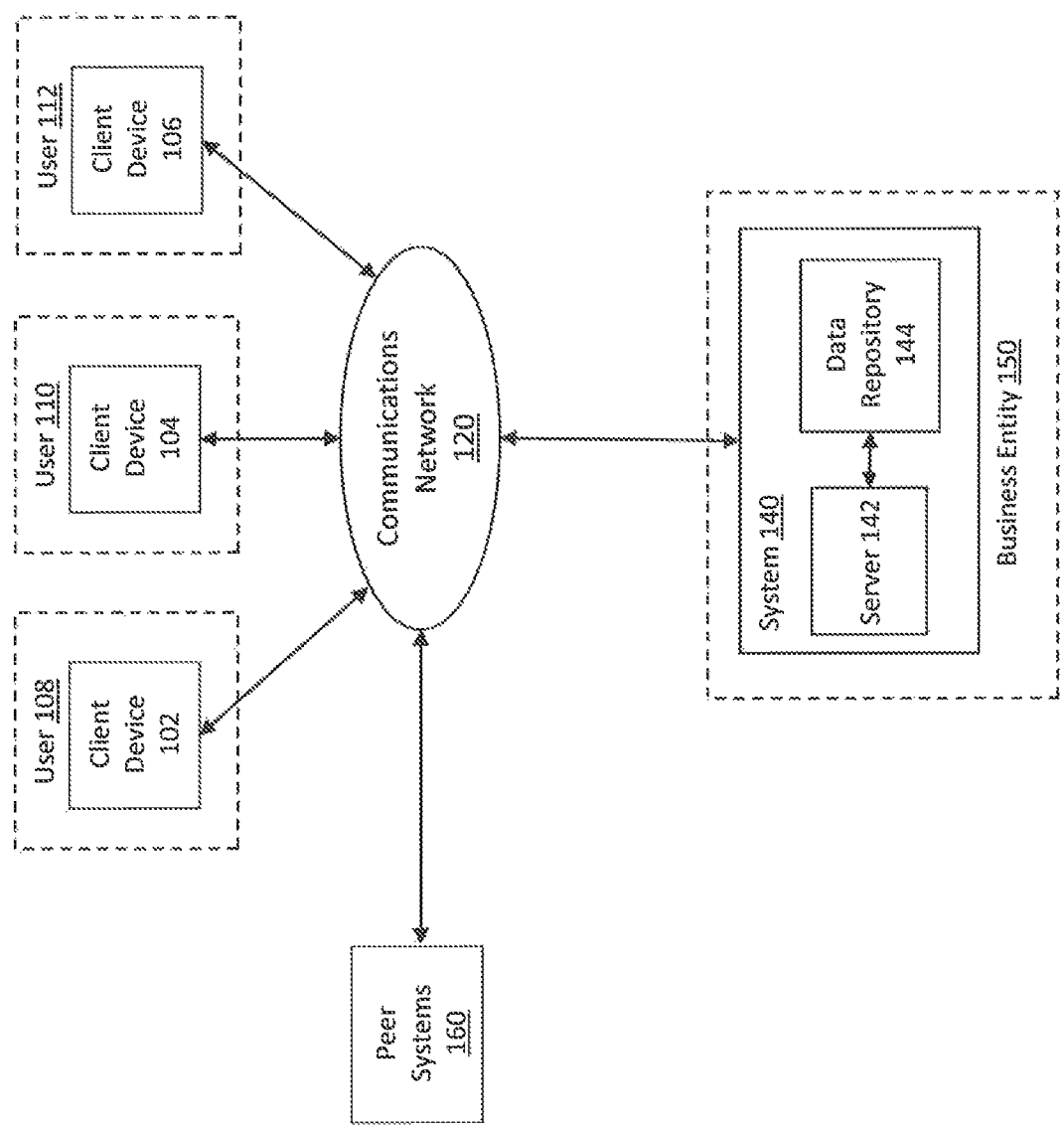
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Exemplary Computing Environments, Networks, Systems, and Devices

FIG. 1 illustrates an exemplary computing environment 100 consistent with certain disclosed embodiments. In one aspect, computing environment 100 may include client devices 102, 104, and 106, system 140, peer systems 160, and a communications network 120 connecting one or more of the components of environment 100.

Consistent with the disclosed embodiments, one or more of the components of computing environment 100 may be configured to address problems inherent to conventional blockchain-based ledgers by embedding a private-master encryption key architecture into a conventional blockchain architecture (e.g., a blockchain-based architecture associated with the public Bitcoin™ ledger). In some aspects, the resulting hybrid blockchain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

a. Exemplary Client Devices

In one embodiment, client devices 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users, such as users 108, 110, and/or 112. For instance, user 110 may operate client device 104 and may do so to cause client device 104 to perform one or more operations consistent with the disclosed embodiments.

Client devices 102, 104, and/or 106 may include one or more tangible, non-transitory memories that store data and/or software instructions, and one or more processors configured to execute software instructions. Client devices 102, 104, and/or 106 may include one or more display devices that display information to a user and one or more input device(s) to allow the user to input information to client device 102, 104, and/or 106 (e.g., keypad, keyboard, touchscreen, voice activated control technologies, or any other type of known input device).

In one aspect, client devices 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid blockchain ledger generated and maintained in accordance with the disclosed embodiments.

In other instances, and as described below, one or more of client devices 102, 104, and/or 106 may execute the one or more stored software application and to obtain data from the hybrid blockchain ledger that includes, but not limited to, data identifying one or more tracked assets, and/or a public key of one or more users. Further, and as described below, the one or more executed software applications may cause client devices 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets). In additional instances, and as further described below, client devices 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

b. Exemplary Computer Systems

System 140 may be a computing system configured to execute software instructions to perform one or more operations consistent with disclosed embodiments. In one aspect, system 140 may be associated with a business entity 150 (e.g., a financial institution) that provides financial accounts, financial services transactions, and investment services one or more users (e.g., customers of the business entity 150). In some aspects, system 140 may be a distributed system that may include computing components distributed across one or more networks, such as network 120, or other networks.

In one aspect, system 140 may Include computing components configured to store, maintain, and generate data and software instructions. For example, system 140 may include one or more servers (e.g., server 142) and tangible, non-transitory memory devices (e.g., data repository 144). Server 142 may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 102, 104, and/or 106 may be configured by the executed application program to present portions of the information to corresponding users through a corresponding graphical user interface (GUI).

In further aspects, server 142 (or other computing components of system 140) may be configured to provide to client devices 102, 104, and/or 106 (and/or receive from client device 104) information associated with services provided by business entity 150. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private blockchain keys), and transmit at least the private blockchain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private blockchain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a centralized authority for the hybrid public-private ledger).

Further, and as outlined below, system 140 may be configured to store the one or more established rules (e.g., as a rules engine) and one or more of the established triggering events (e.g., as an event trigger list) within a portion of a local data repository (e.g., data repository 144). Additionally or alternatively, system 140 may be configured to store portions of the rules engine and/or event trigger list within a secure data repository accessible to system 140 across network 120 (e.g., cloud-based storage).

As described above, one or more computing components of system 140 (e.g., server 142) may be configured to generate pairs of public and private blockchain keys for user 110 (e.g., user 110's public/private blockchain key pair), and to provide the generated private blockchain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications. Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger c. Exemplary Data Repositories and Stored Data Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150, e.g., a financial institution.

For instance, data repository 144 may store customer data that uniquely identifies customers of a financial institution associated with system 140. By way of example, a customer of the financial institution (e.g., users 108, 110, and/or 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by financial system 140, biometric information, and information facilitating enhanced authentication techniques).

In additional aspects, and as described above, data repository 144 may store a rules engine identifying one or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 108, 110, and/or 112, processes that recover assets racked in the hybrid public-private ledger, etc.). Further, and as described above, data repository 144 may also store information identifying an event triggers list that identifies causal relationships established by system 140 between one or more of the established rules and one or more events that trigger an initiation of one or more corresponding regulated distributions, transactions, and/or assets tracked within the hybrid blockchain ledger (e.g., "triggering events").

In some aspects, system 140 may be configured to establish one or more of the rules, and further, one or more of the causal relationships and triggering events, based on one or more internal regulations associated with business entity 150. In other aspects, system 140 may establish one or more of the rules and/or triggering events based on information received from one or more of users 108, 110, and/or 112 (e.g., as input provided to a web page or other graphical user interface (GUI) presented by client devices 102, 104, and/or 106 and provided to system 140).

In an embodiment, data repository 144 may also store a copy of a master key and private crypto keys associated with users 108, 110, and 112 (and additionally or alternatively, additional private crypto keys associated with other users). By way of example, system 140 may be configured to store the private crypto keys in a data structure that includes information that associates the private crypto keys with corresponding ones of user 108, 110, and 112, and further, may be configured to store the master key in a data structure within data repository 144 that is inaccessible to users 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list.

d. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

e. Exemplary Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid blockchain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid blockchain ledger that includes the received information, either alone (e.g., using a "one transaction, one block" paradigm) or in combination with information identifying additional distributions, transactions, or other actions associated with one or more tracked assets (e.g., as a multiple-transaction block). The one or more of peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 102, 104, and/or 106 (and additionally or alternatively, other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid blockchain ledger.

II. Exemplary Processes for Tracking Assets Using Hybrid Private-Public Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent blockchain ledgers. In some aspects, the use of public blockchain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

a. Tracking Assets Using Conventional Blockchain Ledgers

Figure 2:
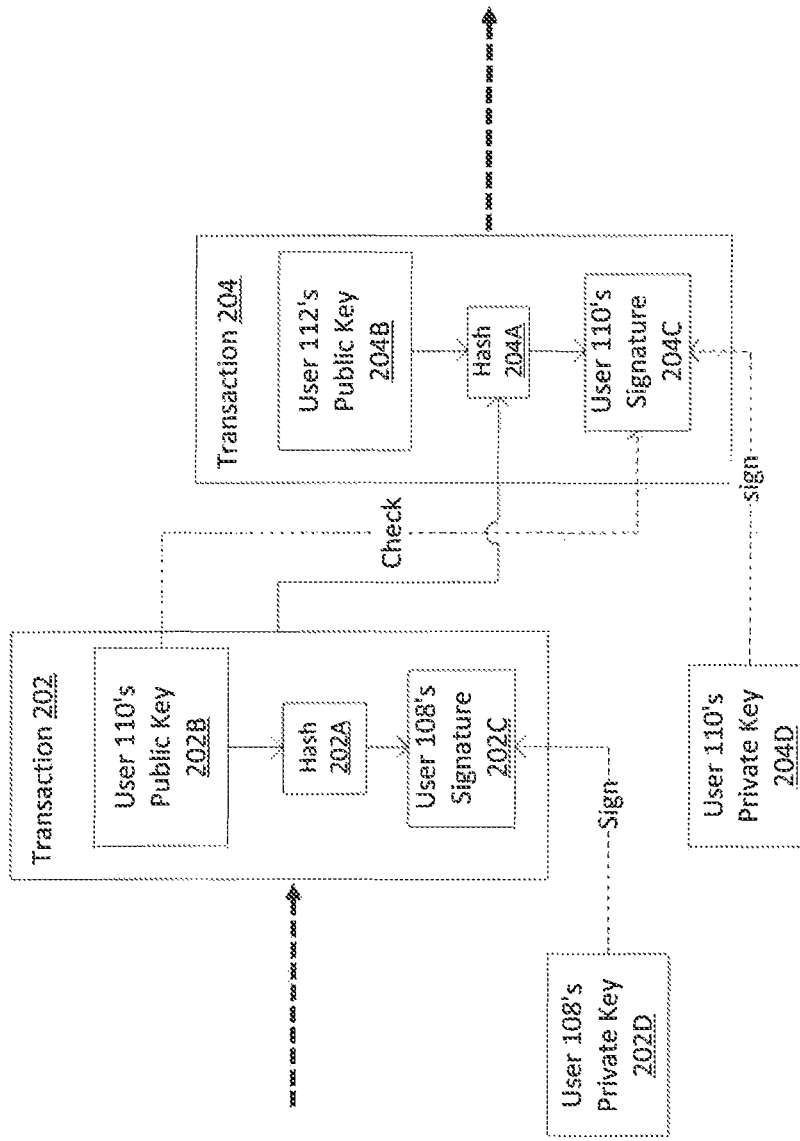
FIG. 2 is a schematic diagram illustrating a conventional blockchain ledger architecture.

FIG. 2 is a schematic diagram of an exemplary structure 200 of a conventional blockchain ledger, which may be generated through the interaction of components of computing environment 100. For example, as described in reference to FIG. 2, a user (e.g., user 110) may be associated with a device (e.g., client device 104) that executes a stored software application (e.g., a wallet application) capable of obtaining a current version of a conventional blockchain ledger from one or more networked computer systems (e.g., one of peer systems 160 configured to "mine" broadcasted transaction data and update ledgers). In some aspects, the current version of a conventional blockchain ledger may represent a "longest" blockchain ledger that includes a maximum number of discrete "blocks," which may identify transactions that transfer, distribute, etc., portions of tracked assets among various owners, including user 110.

For example, client device 104 may obtain the current blockchain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously verified, processed, and packed data associated with transaction 202, which may be added into a corresponding block of the conventional blockchain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 202B using a private key 202D of user 108 through any of a number of techniques apparent to one of skill in the art and appropriate to the conventional blockchain ledger architecture. By way of example, the presence of user 108's public key within transaction data included within the conventional blockchain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction 204 of FIG. 2) that transfers ownership of the tracked asset portion from user 110 to user 112, and further, that transmit the generated data to one or more of peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional blockchain ledger may enable various devices and systems (e.g., client devices 102, 104, and/or 106, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the blockchain ledger, and may competitively process the received transaction data (either alone or in conjunction with other data) to generate additional blocks of the ledger, which may be appended to the blockchain ledger and distributed across peer systems 160 (e.g., through a peer-to-peer network) and to other connected devices of environment 100.

In some aspects, conventional blockchain ledger architectures described above may enable the public to review content of the ledgers and verify ownerships. Further, the decentralized nature of conventional blockchain ledgers may also enable multiple distributed networks to verify the contents of a single ledger. The resulting redundancy may render conventional blockchain ledger architecture more robust than centralized server systems, and effectively eliminate the falsification of ledger data by malicious parties.

Despite these advantages, conventional blockchain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional blockchain ledgers, may represent private information that should not be available to future owners, let alone members of the public.

Further, if an owner were to lose or misplace a corresponding private key, the distributed nature of conventional blockchain ledger architectures, such as those described above, provide little recourse to recover possession of the one or more tracked assets. In certain aspects, the rigidity and inflexibility of these conventional blockchain ledger architectures, and their inability to adapt to changing circumstances (e.g., loss of private keys, theft of tracked assets due to fraudulent or malicious activity), often results in volatility in the usage of the tracked assets and an erosion in a public trust of conventional blockchain ledgers.

Thus, there is a need for improved systems and methods that not only enhance the security of blockchain ledger architectures for use high-risk, sensitive applications, but that also provide a framework that provides owners or holders of assets tracked by blockchain ledger architectures with recourse in an event of fraud or malicious activity, while maintaining the public availability and verification characteristic of blockchain ledgers.

b. Exemplary Hybrid Public-Private Blockchain Ledger Architectures

The disclosed embodiments address these and other problems associated with conventional block-ledger architectures in a technical manner, by providing computer-implemented systems and methods that augment a conventional blockchain ledger with a private-master encryption key architecture that, in conjunction with an owner's pair of public and private blockchain keys, selectively encrypt ledger data to protect both a privacy of owners of tracked assets and a confidentiality of existing instruction sets maintained within the blockchain ledger.

Further, by incorporating an encrypted rules engine and corresponding list of triggering events (e.g., an event triggers list) into each block of the conventional blockchain ledger architecture (and thus generating a hybrid, public-private blockchain architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

In certain aspects, discrete data blocks of the conventional blockchain ledgers (e.g., as outlined above in reference to FIG. 2) and of the hybrid blockchain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid blockchain ledgers may represent any additional or alternate transaction appropriate to the tracked assets, and further, any additional or alternate data appropriate to the tracked assets and to the transaction.

In contrast to the conventional blockchain ledgers described above, the disclosed embodiments may establish a "centralized authority" capable of vetting real-time transactions (e.g., distributions, transfers, and/or other actions) involving portions of assets tracked within the exemplary hybrid blockchain ledger architectures described herein, and further, of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, and as described above, business entity 150 may represent the centralized authority, and one or more computing components of system 150 may perform operations that establish the rules engine and the list of triggering events, which may be stored within a secure data repository (e.g., data repository 144). In some aspects, the generated and stored rules engine may identify one or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that create a new transaction and generate a new pair of public and private blockchain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional blockchain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the centralized authority and/or information facilitating a processing of the transaction blocks throughout the hybrid blockchain ledger. In certain aspects, system 140 may also perform operations that generate and maintain additional private cryptographic keys (e.g., a private "crypto" key) associated with each owner associated with the assets tracked within the hybrid blockchain ledger (e.g., users 108, 110, and/or 112) and further, that would enable the owners to decrypt and access the list of triggering events and additionally or alternatively, the metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid blockchain ledger. For example, system 140 may perform operations that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into blocks of the hybrid blockchain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid blockchain ledger. The owners and/or user may, through corresponding client devices, view the individual events that, when detected by system 140, could cause system 140 to perform operations that recover, authorize, audit, and/or verify the transaction and/or ownership data included within the hybrid blockchain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid blockchain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid blockchain ledger. For example, the one or more of peer systems 160 may incorporate the hashed and encrypted modified rules engine into the hybrid blockchain ledger as a special transaction (e.g., a "0" value transaction), such that the hybrid blockchain ledger tracks each change within the modified rules engine.

Figure 3:
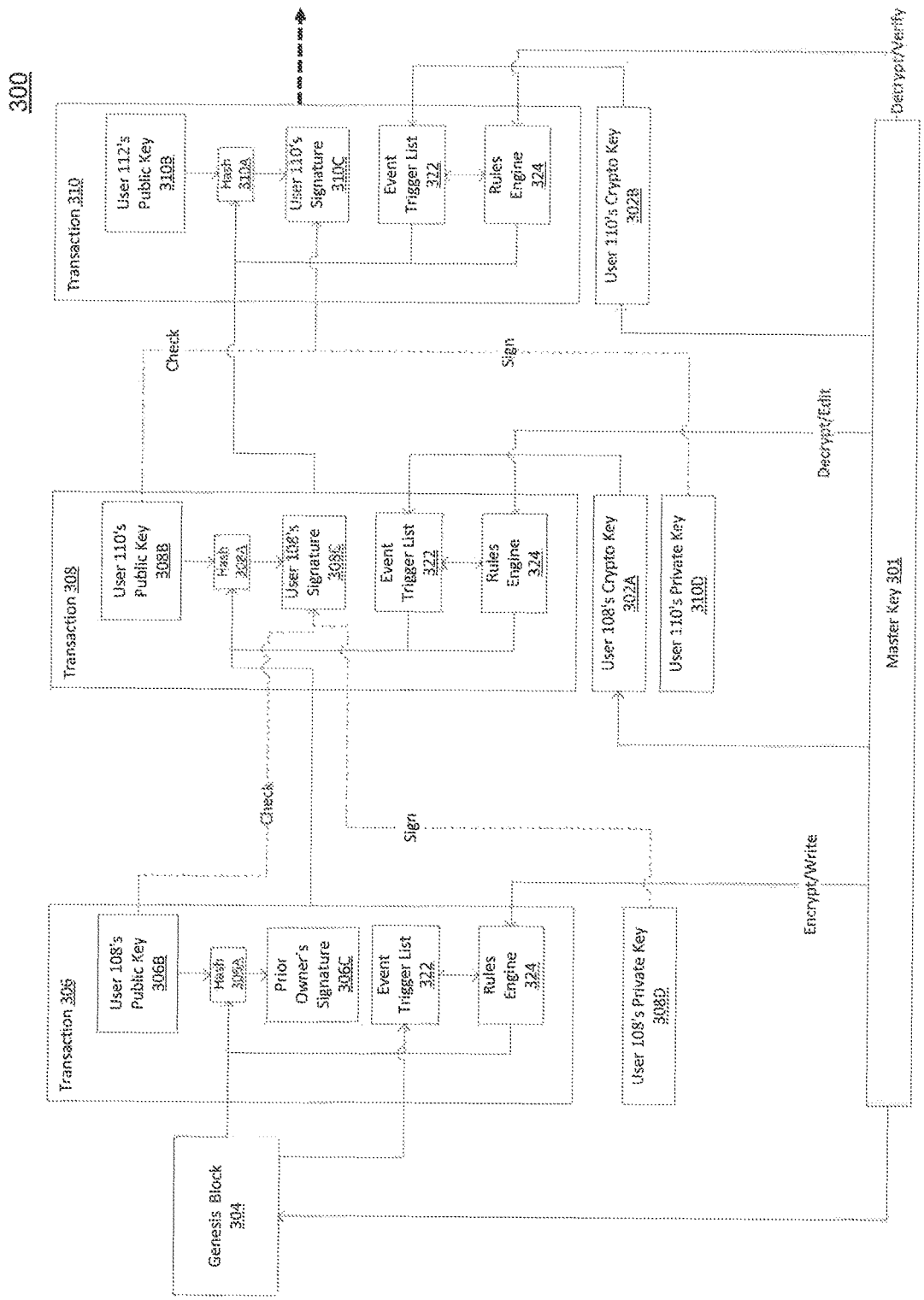
FIG. 3 is a schematic diagram illustrating a hybrid, public-private blockchain ledger architecture, consistent with disclosed embodiments.

FIG. 3 is a schematic diagram of Illustrating an exemplary structure 300 of a hybrid, public-private blockchain ledger, which may be generated through the interaction of components of computing environment 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

Further, in some aspects, and as described above, a system associated with a centralized authority (e.g., system 140 associated with business entity 150) may generate a rules engine that regulate transactions involving the assets tracked by the hybrid blockchain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), which may be maintained in a portion of data repository 144, and may generate additional private "crypto" keys 302A and 302B, which may be associated with corresponding ones of users 108 and 110. In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid blockchain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid blockchain ledger, including genesis block 304, from one or more networked computer systems (e.g., one of peer systems 160 configured to "mine" broadcast transactions and update ledgers). In some aspects, the current version of a hybrid blockchain ledger may represent a "longest" blockchain ledger that includes a maximum number of discrete "blocks," which may identify transactions that transfer, distribute, etc., portions of tracked assets among various owners, including user 108.

For example, client device 102 may obtain the current hybrid blockchain ledger, and may process the hybrid blockchain ledger to determine that a prior owner transferred ownership of a portion of the tracked assets to user 108 in a corresponding transaction (e.g., transaction 306, schematically illustrated in FIG. 3). As described above, one or more of peer systems 160 may have previously verified, processed, and packed data associated with transaction 306, which may be added into a corresponding block of the conventional blockchain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 306 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the conventional blockchain ledger architecture.

Further, and in contrast to the conventional blockchain ledger architectures described above, transaction 306 may also include encrypted and/or hashed copies of rules engine 324 and event trigger list 322. In certain aspects, a device of the prior owner (e.g., which may execute one or more software applications) may access genesis block 304 (e.g., from the current version of the hybrid blockchain ledger obtained from one or more of peer systems 160), may parse genesis block 306, and may extract copies of the encrypted and/or hashed rules engine 324 and event trigger list 322. The prior owner's device may transmit to one or more of peer systems 160 along with the hash 306A, public key 306B, and digital signature 306C for verification, processing (e.g., additional cryptographic hashing) and inclusion into a new block of the hybrid blockchain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid blockchain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. Further, and by way of example, the presence of user 108's public key within transaction data included within the conventional blockchain ledger may enable various devices and systems (e.g., client devices 102, 104, and/or 106, peer systems 160, etc.) to verify the user 108's digital signature 308C, as applied to data specifying transaction 308.

Additionally, and as described above, client device 102 may also parse data specifying prior transaction 306 (e.g., as obtained from the current version of the hybrid blockchain ledger) and extract encrypted and/or hashed copies of rules engine 324 and event trigger list 322. In certain aspects, client device 102 may append the encrypted and/or hashed copies of rules engine 324 and event trigger list 322 to the data specifying transaction 308 (e.g., cryptographic hash 308A, public key 308B, and digital signature 308C), and transmit the data specifying transaction 308 to one or more of peer systems 160 for verification, processing (e.g., additional cryptographic hashing) and inclusion into a new block of the hybrid blockchain ledger.

Further, and as described above, private crypto key 302A may enable client device 102 (e.g., associated with user 108) to access encrypted event trigger list 322 upon extracted from the hybrid blockchain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid blockchain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid blockchain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid blockchain ledger may enable various devices and systems (e.g., client devices 102, 104, and/or 106, peer systems 160, etc.) to verify the user 110's digital signature 3100C, as applied to data specifying transaction 310.

Additionally, and as described above, client device 104 may also parse data specifying prior transaction 308 (e.g., as obtained from the current version of the hybrid blockchain ledger) and extract encrypted and/or hashed copies of rules engine 324 and event trigger list 322. In certain aspects, client device 104 may append the encrypted and/or hashed copies of rules engine 324 and event trigger list 322 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid blockchain ledger. In an embodiment, ownership of the tracked asset portion may be transferred from user 110 to user 112 upon verification and publication of the data specifying transaction 310 within a corresponding block of the hybrid blockchain ledger by peer systems 160.

Further, and as described above, private crypto key 302B may enable client device 104 (e.g., associated with user 110) to decrypt event trigger list 322 upon extraction from the hybrid blockchain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid blockchain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid blockchain ledger. For example, client devices 102, 104, and/or 106 may generate transaction data that includes rules engine and list of triggering events, and one or more of peer systems 160 may embed the generated transaction data into blocks of the hybrid blockchain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
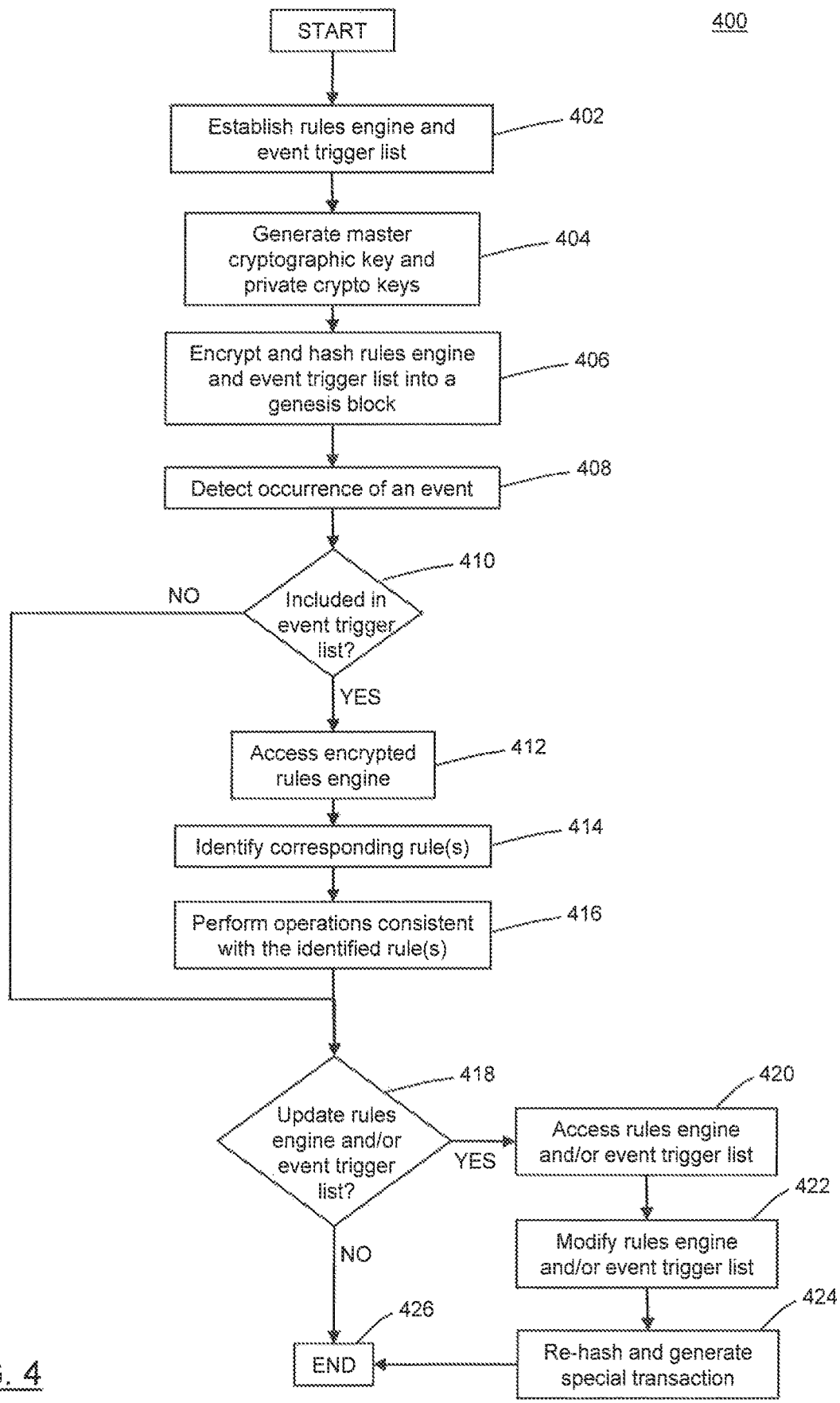
FIG. 4 is a flowchart of an exemplary process for performing event-based operations on assets tracked within a hybrid blockchain ledger, consistent with the disclosed embodiments.

FIG. 4 is a flowchart of an exemplary process 400 for automatically performing event-based operations on assets tracked within a hybrid blockchain ledger in accordance with disclosed embodiments. In an embodiment, a centralized authority may be assigned to establish regulatory-based, policy-based, and customer-specified control over assets tracked within the hybrid blockchain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the centralized authority (e.g., system 140 associated with business entity 150) may execute one more stored application programs to cause system 140 to recover, authorize, audit, and/or verify an ownership of at least a portion of the tracked assets and/or transactions involving the tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify one or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that generate a new pair of public and private blockchain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private blockchain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid blockchain ledger. As described above, the generated private crypto keys may enable a device of each owner to decrypt and access the list of triggering events and additionally or alternatively, metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into the blocks of the hybrid blockchain ledger, the disclosed embodiments may ensure that the established rules are followed even in an event of actions by malicious parties that disrupt the tracked assets (e.g., Instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private blockchain key associated with a portion of the tracked assets. In other instances, system 140 may detect an event in step 408 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the centralized authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid blockchain ledger (e.g., in step 424). For example, one or more of peer systems 160 may incorporate the hashed and encrypted modified rules engine and/or list of triggering events into the hybrid blockchain ledger as a special transaction (e.g., a "0" value transaction), such that the hybrid blockchain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid blockchain ledgers consistent with the disclosed embodiments, would not be possible using the conventional blockchain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional blockchain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional blockchain ledger, and the Bitcoins™ associated with the orphaned block are unrecoverable and permanently lost.

In other aspects, user 110 may access a hybrid blockchain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public blockchain keys for user 110, which system 140 may transmit to user 110 through any of the secure non-accessible processes outlined above (e.g., in steps 412, 414, and 416). Upon receipt of the newly generated private key, user 110 may access the hybrid blockchain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding blockchain ledger (e.g., conventional blockchain ledgers described above, and/or hybrid blockchain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional blockchain ledgers described above to determine an address of the malicious entity responsible for the theft. The decentralized and anonymous nature of conventional blockchain ledgers may, however, prevent user 110 from identifying the malicious entity, and the stolen Bitcoins™ may remain permanently unrecoverable.

The disclosed embodiments may, however, address the deficiencies of conventional blockchain ledgers and provide user 110 with recourse to recover the stolen Bitcoins™. For example, the police e-crime unit may notify the centralized authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public blockchain keys for user 110, which system 140 may transmit to user 110 through any of the secure non-accessible processes outlined above (e.g., in steps 412, 414, and 416).

The hybrid blockchain ledger architectures described above may add a level of sophistication to conventional mechanisms for trustless communication by allowing transactions involving tracked assets to occur according to common transaction rules. Further, the hybrid blockchain ledger architectures consistent with the disclosed embodiments may allow owners of the tracked assets to project authority over the tracked assets by establishing customized rules for transaction authorization. Furthermore, and in contrast to the conventional techniques described above, the hybrid blockchain ledger architecture may enable a centralized authority (e.g., business entity 150 associated with system 140) to recover, authorize, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a centralized authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

In additional aspects, the exemplary hybrid blockchain algorithms described above may track a location, performance, usage, and/or status one or more additional client devices (e.g., "connected devices) disposed within computing environment 100 (not shown in FIG. 1), which may be configured to establish communications with client devices 102, 104, and 106, and further, with system 140, using any of the communications protocols outlined above. For example, client device 102, 104, and 106, system 140, and the connected devices may be uniquely identifiable and addressable within communications network 120, and may be capable of transmitting and/or receiving data across the established communications sessions.

Further, in some aspects, system 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and/or computer-based device that includes one or more processors and tangible, computer-readable memories, as described above in reference to client devices 102, 104, and 106. By way of example, connected devices consistent with the disclosed embodiments may include, but are not limited to mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

Further, in additional aspects, the connected devices may include sensor devices in communication with the one or more processors and the memories. The sensor devices may, in some aspects, be configured to monitor the usage, location, status, etc., of corresponding ones of the connected devices, and may be configured to provide sensor data to corresponding ones of the processors. In some aspects, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices.

In other aspects, computing environment 100 may include one or more additional computing systems in communication with the connected devices using any of the communications protocols outlined above. The additional computing system may, in an embodiments, include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either at regular intervals or in response to requests from the connected devices. In some instances, the additional computing systems may be implemented as processor-based and/or computer-based systems consistent with the exemplary systems described above.

In further aspects, the connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. By way of example, the sensor data may characterize an interaction between the connected devices and users 108, 110, and 112 (e.g., the monitored data may represent usage data indicative of a consumption of one or more services provided by the connected devices), and the connected devices may transmit the usage data for users 108, 110, and/or 112 to corresponding ones of client devices 102, 104, and/or 106, which may store the received usage data in a corresponding data repository. In further aspects, the connected devices may also transmit the usage data to system 140, along with information linking specific elements of the usage data to corresponding users and/or client devices (e.g., user 110's usage data may be linked to an identifier of user 110 and/or of client device 104). In certain aspects, as described below in reference to FIGS. 5A, 5B, and 6, client devices 102, 104, and/or 106 may also incorporate corresponding portions of the monitored data, e.g., as received from the connected devices, into hybrid blockchain ledgers consistent with the disclosed embodiments in order to record, track, and publicly monitor the location, performance, usage, and/or status of the connected devices.

Figure 5A:
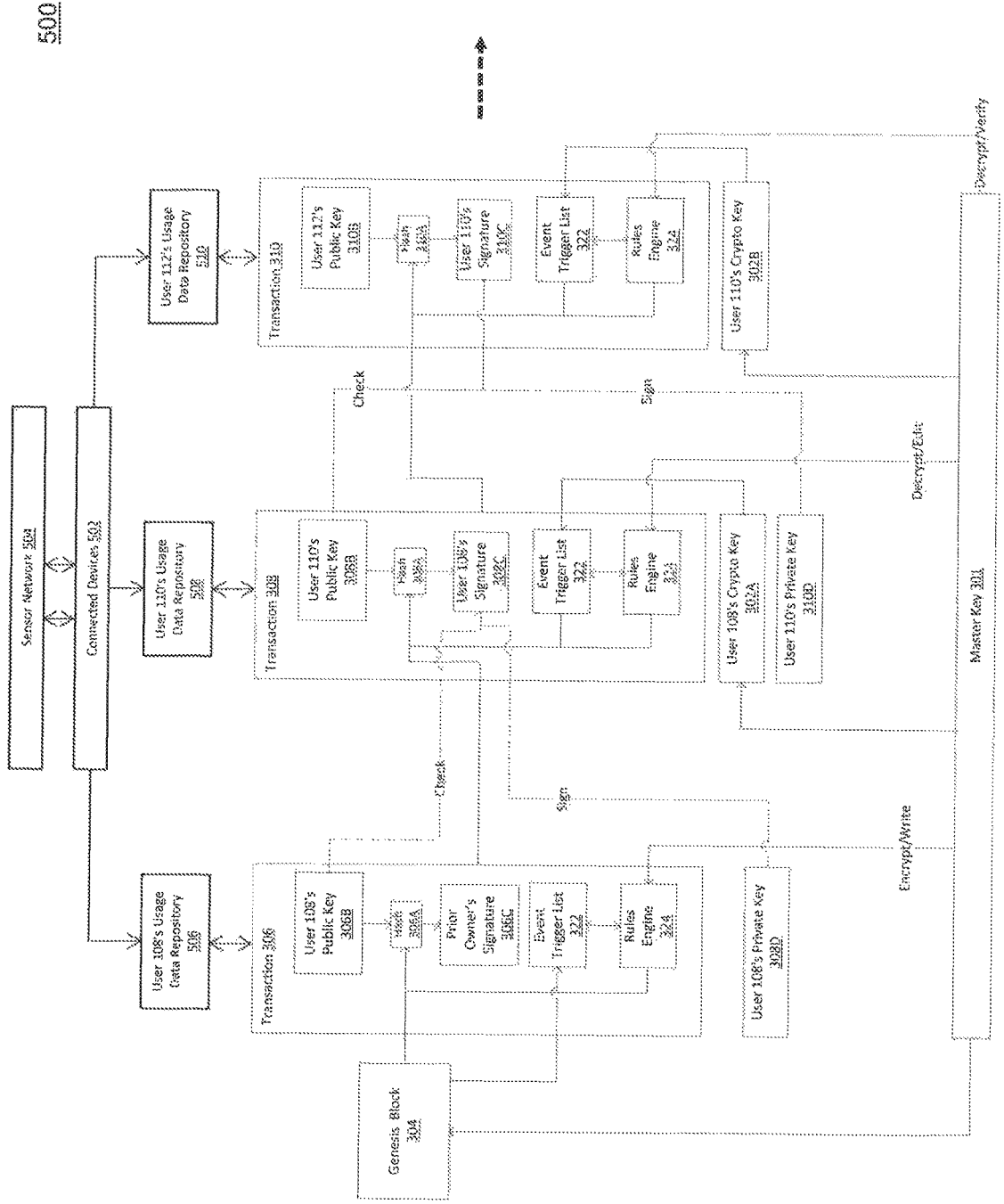
FIGS. 5A, 5B, and 6 are schematic diagrams illustrating additional hybrid, public-private blockchain ledger architectures, consistent with disclosed embodiments.
Figure 5B:
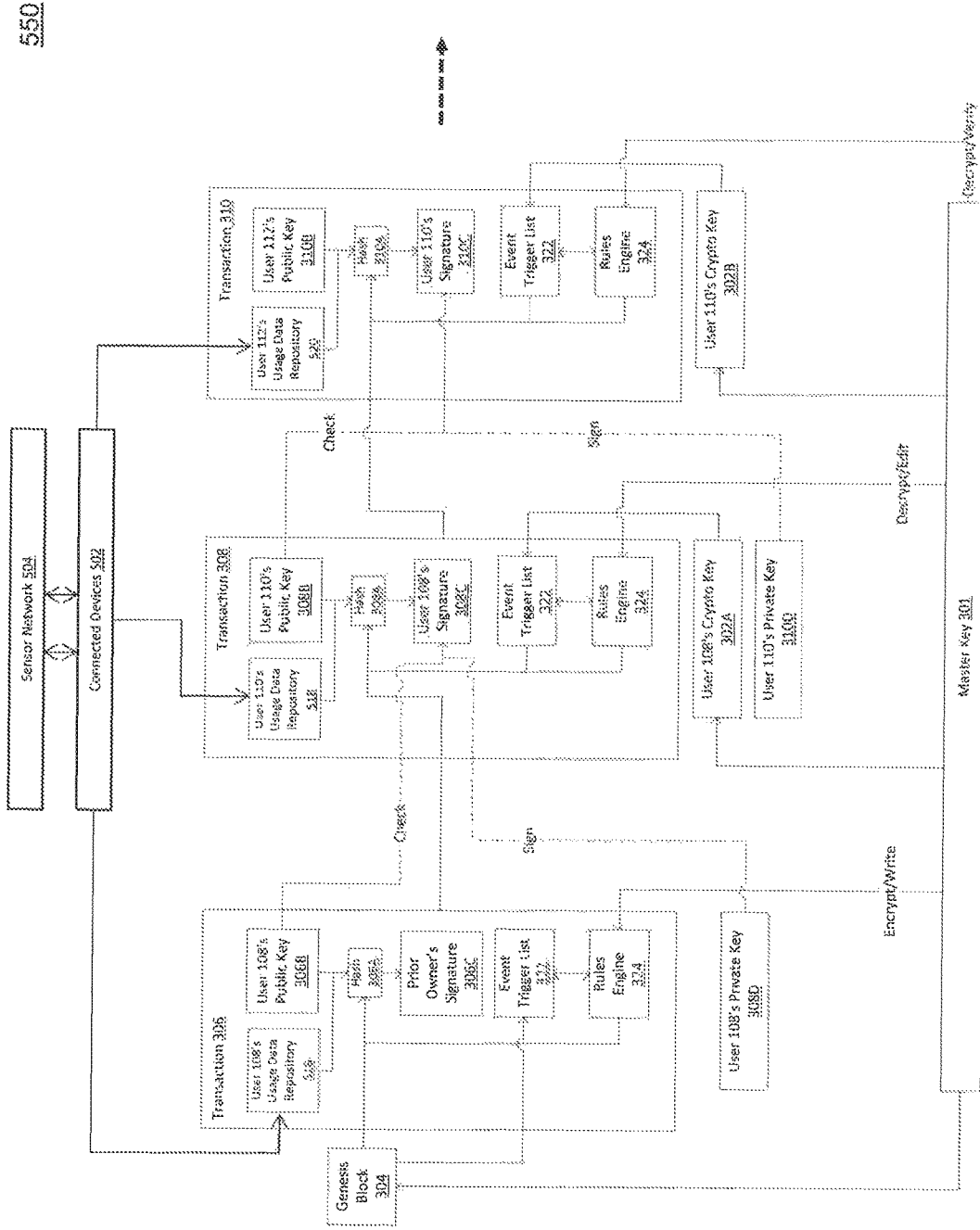

FIG. 5A is a schematic diagram of illustrating an exemplary structure 500 of a hybrid, public-private blockchain ledger, which may be generated through the interaction of components of computing environment 100, in accordance with the disclosed embodiments. For example, as described in reference to FIG. 4, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

In some aspects, and as described above, the embodiments described in FIG. 5 may incorporate the exemplary hybrid blockchain ledger described above in reference to FIG. 3 (e.g., hybrid blockchain ledger structure 300), and may augment hybrid blockchain ledger structure 300 to include and track monitored data indicative of a location, performance, usage, and/or status of one or more connected devices 402 disposed within environment 100 and in communication with client devices 102, 104, and 106. For example, and as described above, connected devices 502 may be implemented as processor-based and/or computer-based systems that include one or more processors and corresponding tangible, non-transitory computer-readable memories.

Further, the one or more processors of connected devices 502 may obtain sensor data from one or more on-board sensor devices capable of monitoring connected devices 502 and additionally or alternatively, from one or more external sensor devices disposed within additional computing systems in communication with connected devices 502. The on-board and external sensor devices may, in some aspects, collectively form a sensor network 504 that generates and provides sensor data to the connected devices. For instance, and as described above, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental Interactions, etc.), and data describing any additional or alternate characteristics of the connected devices capable of being monitored and quantified by the sensor devices. In some aspects, the connected devices may be configured to transmit portions of the received sensor data to corresponding ones of client devices 102, 104, and 106, and to system 140, using any of the communications protocols outlined above (e.g., through peer-to-peer communications, etc.).

For example, the sensor data received by connected devices 502 may specify a usage or a consumption of one or more services of the connected devices by corresponding ones users 108, 110, and 112 (e.g., associated with client devices 102, 104, and 106). In some aspects, portions of the usage data attributable to corresponding ones of users 108, 110, and 112 may be transmitted to corresponding ones of client devices 102, 104, and 106, and further, to system 140. In further aspects, the user-specific portions of the usage data may be stored outside of the hybrid, blockchain data structures and within corresponding user-specific usage data repositories (e.g., usage data repositories 506, 508, and/or 510 of FIG. 5A). In other aspects, illustrated in FIG. 5B, the user-specific portions of the usage data may be stored within the hybrid, blockchain data structures and in decrypted form within corresponding user-specific usage data repositories (e.g., usage data repositories 516, 518, and/or 520 of FIG. 5B).

In some embodiments, as described below in reference to FIG. 6, client devices 102, 104, and/or 106, in conjunction with system 140, may augment the exemplary hybrid blockchain ledger structures described above to include usage data and corresponding metadata. Using the resulting hybrid blockchain ledger, one or more devices and systems operating within environment 10 may monitor the location, performance, usage, and/or status of the connected devices over time (e.g., during transfers in ownership of the connected devices, use of the connected devices as collateral, etc.).

Figure 6:
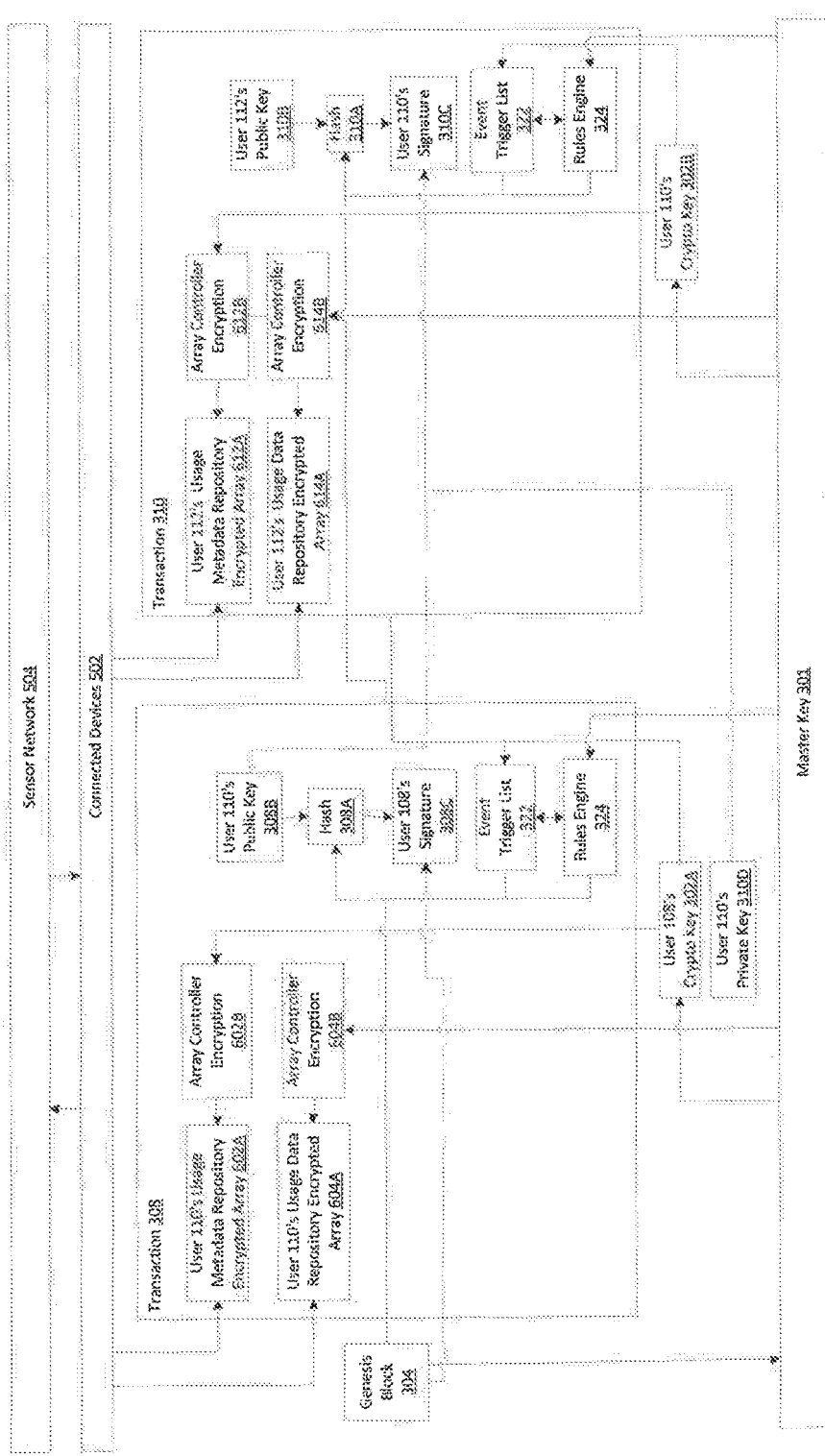

FIG. 6 is a schematic diagram of illustrating an exemplary structure 600 of a hybrid, public-private blockchain ledger, which may be generated through the interaction of components of computing environment 100, in accordance with the disclosed embodiments. For example, as described in reference to FIG. 6, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

In some aspects, and as described above, the embodiments described in FIG. 5 may incorporate the exemplary hybrid blockchain ledger described above in reference to FIGS. 3 and 5 (e.g., hybrid blockchain ledger structures 300 and 400), and may augment hybrid blockchain ledger structure 300 of FIG. 3 to include and track monitored data indicative of a location, performance, usage, and/or status of one or more connected devices 502 disposed within environment 100 and in communication with client devices 102, 104, and 106, as received from sensor network 404.

For example, and as described above, a prior user (e.g., user 108) may elect to further transfer a portion of tracked assets to an additional user (e.g., user 110). For example, as described above, the one or more software applications executed by client device 102 may cause client device 102 to perform operations that generate input and output data specifying a new transaction (e.g., transaction 308 of FIG. 6) that transfers ownership of the tracked asset portion from user 108 to user 110, and further, that transmit the generated data to one or more of peer systems 160 for verification, processing (e.g., additional cryptographic hashing) and inclusion into a new block of the hybrid blockchain ledger.

For example, data specifying transaction 308 may include, but is not limited to, a cryptographic hash 308A of a prior transaction (e.g., which transferred ownership to user 108), a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. As described above, the presence of user 108's public key within transaction data included within the conventional blockchain ledger may enable various devices and systems (e.g., client devices 102, 104, and/or 106, peer systems 160, etc.) to verify the user 108's digital signature 308D, as applied to data specifying transaction 308. Further, and as described above, client device 104 may also parse data specifying the prior transaction and extract encrypted and/or hashed copies of rules engine 322 and trigger event list 324.

Additionally, in some aspects, the data specifying transaction 308 may also include user 108's usage data (e.g., as received from connected devices 402 using any of the exemplary techniques described above), which may be encrypted using master key 301 (e.g., by array controller encryption 604B) to generate an encrypted array 604A of user 108's usage data. In further aspects, the data specifying transaction 308 may also include metadata indicative of a duration of usage, time, date, location, and/or other network connected devices in proximity, which may be encrypted using user 108 private crypto key 302A (e.g., by array controller encryption 602A) to generate an encrypted array of metadata 602A.

In certain aspects, client device 102 may append the encrypted and/or hashed copies of rules engine 322 and trigger event list 324 to the data specifying transaction 308 (e.g., cryptographic hash 308A, public key 308B, and digital signature 308C) and the usage data (e.g., encrypted arrays 602A and 604A and array controller encryption 602B and 604B), and transmit the data specifying transaction 308 to one or more of peer systems 160 for verification, processing (e.g., additional cryptographic hashing) and inclusion into a new block of the hybrid blockchain ledger.

In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 6) that transfers ownership of the tracked asset portion from user 110 to user 112, and further, that transmit the generated data to one or more of peer systems 160 for verification, processing (e.g., additional cryptographic hashing) and inclusion into a new block of the hybrid blockchain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid blockchain ledger may enable various devices and systems (e.g., client devices 102, 104, and/or 106, peer systems 160, etc.) to verify the user 110's digital signature 310C, as applied to data specifying transaction 310.

Further, and as described above, data specifying transaction 310 may also include user 110's usage data (e.g., as received from connected devices 402 using any of the exemplary techniques described above), which may be encrypted using master key 301 (e.g., by array controller encryption 614B) to generate an encrypted array 614A of user 108's usage data. In further aspects, the data specifying transaction 308 may also include metadata indicative of a duration of usage, time, date, location, and/or other network connected devices in proximity, which may be encrypted using user 110's private crypto key 302A (e.g., by array controller encryption 612B) to generate an encrypted array of metadata 612A.

In certain aspects, client device 104 may append the encrypted and/or hashed copies of rules engine 322 and trigger event list 324 to the data specifying transaction 310 (e.g., cryptographic hash 310A, public key 310B, and digital signature 310C) and the usage data (e.g., encrypted arrays 612A and 614A and array controller encryption 612B and 614B), and transmit the data specifying transaction 310 to one or more of peer systems 160 for verification, processing (e.g., additional cryptographic hashing) and inclusion into a new block of the hybrid blockchain ledger.

In certain embodiments, as described above, the inclusion of usage data within hybrid blockchain ledgers maintains an continuous log of usage and/or consumption of connected-device resources by users 108, 110, and 112, and any additional or alternate users that generate and submit (through corresponding client devices) transaction data to one or more of peer systems 160. In further aspects, the sensor data (e.g., as received from connected devices 402) may be batched in a periodic set and treated as a transaction, and additionally or alternatively, may be appended into an associated repository of the transaction blockchain (e.g., using system 140, peer systems 160, etc.).

Further, in some aspects, the exemplary blockchain ledgers described above may facilitate processes that track an ownership of one or more of the connected devices and further, enable current owners (e.g., user 110) to transfer ownership to others (e.g., user 112). For example, when the disclosed embodiments create a new block to account for usage data, a private key of the current owner may be user to authenticate the usage and allow for the generation of the new block. In other aspects, a private key linked to a device of the current owner (e.g., stored locally on a memory of the current owner's device) may authenticate the usage and allow for the generation of the new block without input or intervention from the current owner. In some instances, the private key of the current owner's device may differ from the current owner's private key, Further, and in some embodiments, the automated and programmatic authentication of the usage by the current owner's device may reduce instances of under-reported usage data associated with owner-initiated authentication protocols.

III. Exemplary Processes for Tracking and Automated Transfer of Ownership Interests Using Hybrid, Blockchain Data Structures In various embodiments, such as those described above, computer systems maintained by a rules authority (e.g., a financial institution, etc.) may augment conventional, decentralized blockchain ledger architectures by selectively encrypting ledger data to protect both privacy of owners of tracked assets and confidentiality of existing instruction sets maintained within the blockchain ledger. Further, by incorporating an encrypted rules engine and corresponding list of triggering events (e.g., an event trigger list) into each block of the conventional blockchain ledger architecture (and thus generating a hybrid, public-private blockchain ledger architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

a. Exemplary Hybrid. Blockchain Ledger Data Structures Tracking Asset Ownership and Distribution In other aspects, one or more of the exemplary hybrid blockchain ledger architectures described above may provide a centralized and transparent mechanism that establishes an entity's ownership interest in a particular asset or group of assets and further, that record, characterizes, and tracks an evolution of a location, usage characteristics, and/or performance characteristics of the particular asset or group of assets throughout the entity's ownership. As described below, when the entity acquires an ownership interest in the particular asset or group of assets, the disclosed embodiments may be configured to generate a new ledger block within the established hybrid, blockchain ledger data structure that confirms the entity's ownership stake and specifies data (e.g., "transaction data") characterizing a transaction by which the entity obtained the ownership stake. As described above, the disclosed embodiments may be configured to append the new ledger block to an existing hybrid, blockchain ledger data structure, which may be distributed to computer systems maintained by the entity and other interested parties (e.g., financial institutions, governmental entities, auditors, etc.).

In additional aspects, one or more of the exemplary hybrid blockchain ledger architectures described above, which may track an entity's ownership stake in a particular asset or group of assets, may also establish a centralized process by which a computer system maintained by the entity and/or the other interested parties may track and reconcile an inventory of assets. By way of example, the entity may operate one or more connected devices within a computing environment, and computer systems maintained by the entity may establish and distribute to the connected devices electronic signals that require the connected devices to send a signal (e.g., a "keep alive" signal) at predetermined intervals and provide corresponding locations, usage characteristics, performance characteristics for inclusion within hybrid blockchain ledger data structures and/or send a signal only upon a change in the location, usage characteristics, and/or performance characteristics. In certain aspects, the maintained computer systems and connected devices may collectively form a "connected-asset inventory system," the components of which may be tracked by one or more of the exemplary hybrid blockchain ledger data structures described above. Further, in an event that one of the connected devices fails to send a corresponding "keep alive" signal to the connected asset inventory system, the disclosed embodiments may facilitate an automated process that reconciles the entity's inventory of connected devices.

The disclosed embodiments may also include centralized and automated processes that, in response to a detection of one or more established trigger conditions, initiate a sale, distribution, or re-allocation of ownership interests of one or more of assets held by an entity (e.g., connected devices that form a portion of a connected-asset inventory system). By way of example, the entity may establish one of more conditions that would trigger a sale, distribution, or re-allocation of an ownership interest in one or more assets, and further, may establish one or more rules that govern the sale, distribution, or re-allocation of the ownership interest and/or a distribution of corresponding proceeds. The disclosed embodiments may incorporate the established conditions and rules into corresponding portions of one or more exemplary hybrid blockchain ledger data structures (e.g., within an event trigger list and rules engine) using any of the exemplary techniques described above, and upon detection of a corresponding one or the triggering conditions, initiate the corresponding sale, distribution, or re-allocation of the ownership interest (and additionally or alternatively, disbursement of proceeds) in accordance with the established rules.

By way of example, an entity (e.g., user 110, business entity 150, etc.) may acquire an ownership interest in one or more assets, which include, but are not limited to, a connected device capable of communicating across network 120 with one or more additional devices and computing devices operating within environment 100 (e.g., one of connected devices 102). The connected device may, in some instances, include a storage device that stores one or more software applications, at least one processor that executes the one or more software applications, and further, a communications device that establishes and maintains communications with one or more systems and devices within environment 100 across network 120 (e.g., using any of the communications protocols outlined above).

Further, and as described above, the connected device may include one or more integrated sensor devices and additionally or alternatively, may be communicatively coupled to one or more external sensor devices operating within an external sensor network (e.g., to sensor network 504 across network 120 or using peer-to-peer communication protocols, such as near-field communication (NFC) protocols). In some instances, one or more integrated sensor devices, and additionally or alternatively, one or more of the external sensor devices, may be configured to detect a location of the connected device, performance characteristics of the connected device, usage characteristics of the connected device, and additionally or alternatively, an operational status of the connected device.

In certain aspects, user 110 may purchase the connected device from a physical location of a merchant on behalf of a corporate entity (e.g., business entity 150). The connected device may, for example, form a portion of an inventory of other connected devices held by business entity 150 (e.g., smartphone, tablet computers, connected vehicles, etc.), which may be assigned to various users and may operate across various geographically dispersed business units and sectors of the corporate entity. In other aspects, and consistent with the disclosed embodiments, user 110 may purchase the connected device for personal use, either alone or in conjunction with additional connected devices (e.g., a smartphone operable to exchange information with tablet computer, a network-accessible television, and a network-accessible printer over a wireless network).

In certain aspects, one or more of the exemplary hybrid blockchain ledger data structures described above may establish and track an "inventory" of the one or more connected devices held by user 110, and additionally or alternatively, by business entity 150. In an embodiment, one or more computer systems of environment 100 (e.g., system 140, acting as a rules authority) may process the exemplary hybrid blockchain ledger data structures to track and reconcile the inventory of connected devices, to detect one or more conditions that would trigger a sale, distribution, or re-allocation of one or more of the connected device, and further, to distribute proceeds from the triggered sale, distribution, or re-allocation of the one or more connected devices in accordance with established rules (e.g., as incorporated into rules engine 324).

For example, user 110 and/or business entity 150 may establish one or more triggering events (e.g., "reconciliation events") that specify a schedule by which the one or more connected devices establish communications with system 140, and further, one or more rules (e.g., "reconciliation rules") that specify one or more operations performable by system 140 when one or more of the connected devices fail to establish communications in accordance with the specified schedule. For example, user 110 and/or business entity 150 may establish, as reconciliation events, a schedule that requires each of the one or more connected devices to establish communications with system 140 on a daily or weekly basis, and to provide data indicative of a current location, usage, performance, and/or status of the connected devices for local storage and/or incorporation into corresponding data blocks of the exemplary hybrid blockchain ledgers using any of the techniques described above. Further, in some instances, user 110 and/or business entity 150 may establish reconciliation rules that, when one or more of the connected device fail to establish communications and transmit corresponding location, usage, performance, and/or status data, generate notifications to user 110 and/or business entity 150 (e.g., through corresponding devices held by user 110 and/or representatives of business entity 150) identifying the connected devices that fail to establish the scheduled communications.

In additional aspects, user 110 and/or business entity 150 may establish one or more conditions that, if detected, would cause one or more computer systems to initiate a sale, distribution, or re-allocation of ownership interests in the connected device. By way of example, the established conditions may include, but are not limited to, a temporal condition, a usage condition, a performance condition, and/or a status-related condition. For instance, the temporal condition may specify a particular time period after the purchase of the connected device (e.g., two years, etc.), and the disclosed embodiments may initiate a sale of the connected device to one or more additional parties at the conclusion of the particular time period (e.g., to facilitate a purchase of new version of the connected device).

In other instances, the usage and/or performance condition may specify a threshold value of a particular usage and/or performance metric (e.g., a threshold mileage for a connected vehicle, a threshold number of operational hours for a smartphone, a threshold number of copies for a connected copy machine, etc.), and the status-related condition may identify one or more events Indicative of a physical condition of the connected device (e.g., unintentional drops of the connected device detected by an integrated sensor device, a cracked screen of a smartphone, a collision involving a connected vehicle, etc.). In some instances, the disclosed embodiments may initiate a sale of the connected device to one or more additional parties upon detection of the specified usage metric, the performance metric, and/or the identified event. The disclosed embodiments are, however, not limited to these exemplary conditions, and in further embodiments, conditions specified by user 110 and/or business entity 150 may reflect any additional or alternate characteristic of the connected device capable of being detected and quantified by the integrated and external sensor devices described above.

In additional aspects, user 110 and/or business entity 150 may establish one or more rules (e.g., "disbursement rules") that specify a distribution of proceeds derived from the sale, transfer, or re-allocation of the ownership interests in the connected device (and additionally or alternatively, in other connected devices and tracked assets held by user 110 and/or business entity 150). For example, user 110 may establish disbursement rules specifying a transfer of (i) a first portion of the proceeds from a sale of the connected device (e.g., 50%) into a first financial services account held by user 110 at a financial institution (e.g., a checking, savings, and/or investment account) and (ii) a second portion of the proceeds (e.g., 50%) into a second financial services account held by another party (e.g., a spouse, a child, a merchant, etc.). Similarly, the disbursement rules specified by business entity 150 may identify one or more destination financial services accounts (e.g., associated with various business units or sectors, associated with other parties, such as vendors and contractors, etc.) into which specified portions of the proceeds should be distributed.

In other instances, one or more of the established disbursement rules may reflect a testamentary intent of user 110. For example, user 110 may specify a disbursement rule that identifies a beneficiary that should receive user 110's ownership interest in the connected device (and additionally or alternatively, proceeds from a sale of user 110's ownership interest in the connected device) in an event of user 110's death or incapacitation. The disclosed embodiments are, however, not limited to these exemplary disbursement rules, and in other aspects, user 110 and/or business entity 150 may establish any additional or alternate disbursement rules appropriate to the connected devices and capable of implementation by the one or more interconnected devices and systems of environment 100.

In some aspects, the exemplary hybrid blockchain ledger data structures described above may record and track not only an ownership interest held by user 110 and/or business entity 150 in one or more connected devices, but also one or more reconciliation rules that establish reconciliation events and rules associated with schedule by which the connected devices check-in to system 140 (e.g., within portions of event triggers list 322 and rules engine 324), data identifying conditions that would trigger a sale, transfer, or re-allocation of ownership rights in portions of the connected devices (e.g., within event triggers list 322), and further, disbursement rules governing a disbursement of proceeds derived from the sale, transfer, or re-allocation. In additional aspects, hybrid blockchain ledger data structures may also track an evolution of the locations, usage, performance, and/or statuses of the one or more connected devices throughout an ownership by user 110 and/or business entity 150. The disclosed embodiments may, for example, establish a centralized asset inventory system (e.g., implemented by software applications executed by system 140) that enables user 110 and/or business entity 150 to track and manage corresponding ownership interests in one or more connected device operating within computing environment 100.

For example, as described above, user 110 may elect to purchase a connected device (e.g., one of connected devices 502) from a merchant, and may elect to register the connected device with the centralized asset inventory system described above. In some aspects, a device held by user 110 (e.g., client device 104) may access a web page associated with the centralized asset inventory system (e.g., as provided by server 142 of system 140) and additionally or alternatively, may execute a mobile application provided by and associated with the centralized asset inventory system (e.g., a mobile wallet application, a mobile wallet application provided by the centralized asset inventory system described above, etc.). For instance, user 110 may provide, as input to a web page or other graphical user interface (GUI) presented by client device 104, data identifying the purchase of the connected device from the merchant and data identifying user 110's ownership interest in the connected device.

In some aspects, the provided data may identify, among other things, user 110 (e.g., a full name, an address, a governmental identifier (e.g., a driver's license number, social security number, etc.), the connected device (e.g., a model, a manufacturer, a year of manufacture, a MAC address, an IP address, etc.), and the purchase (e.g., the purchase price, the retailer, etc.). The disclosed embodiments are not limited to the exemplary data elements identified above, and in further embodiments, user 110 may provide, as input to client device 104, any additional or alternate data that identifies the purchase and establishes user 110's ownership interest in the vehicle and would be appropriate for inclusion in the exemplary hybrid, blockchain ledgers described above.

Additionally, in some aspects, user 110 may also provide, as input to a web page or GUI presented by client device 104, data identifying one or more reconciliation rules, triggering conditions, and disbursement rules, as described above. For example, user 110 may provide, as input to the web page or GUI, data identify a reconciliation events that require the connected device establish communications with system 140 on a weekly basis and provide data indicative of a current location, usage, performance, and of status of the connected device, and reconciliation rules that cause system 140 to identify, to user 110, any non-compliant connected devices for reconciliation. In additional aspects, as described above, user 110 may input data to the web page or GUI specifying a temporal condition (e.g., a two-year ownership period) and/or usage condition (e.g., a threshold number of hours of usage and/or a threshold amount of transmitted data) that would trigger a sale, transfer, and/or re-allocation of an ownership interest in the connected device. Additionally or alternatively, user 110 may provide, as input to the web page or GUI, data specifying an equivalent distribution of proceeds of any sale of the connected device to user 110's checking and investment account (e.g., as identified by corresponding account numbers, routing numbers, and financial institution data). The disclosed embodiments are, however, not limited to these exemplary reconciliation rules, triggering conditions, and disbursement rules, and in further embodiments, user 110 may input any additional or alternate reconciliation rules, triggering conditions, and disbursement rule appropriate to the connected devices and to system 140, including those described above.

Client device 104 may process and package the input data, and transmit portions of packaged data to system 140, which may track, monitor, and manage the connected device on behalf of user 110 in accordance with the specified reconciliation rules, triggering conditions, and disbursement rules. In certain aspects, system 140 may store portions of the packaged data that identify user 110, the connected device, and the purchase within a locally accessible data repository (e.g., data repository 144).

Further, and by way of example, system 140 may access an encrypted list of event triggers (e.g., event triggers list 322) and an encrypted rules engine (e.g., rules engine 324), which system 140 may decrypt using any of the exemplary techniques described above (e.g., using master key 301). System 140 may, in certain aspects, modify portions of the decrypted list of event triggers to incorporate the received triggering condition data (e.g., which identifies on or more conditions triggering a sale, disbursement, or re-allocation of user 110's ownership interests in connected device) and/or the received reconciliation events (e.g., specifying a schedule by which the connected device checks-in with system 140). Further, system 140 may modify portions of the decrypted rules engine to incorporate the received reconciliation rules (e.g., specifying operations that notify user 110 of any non-compliant devices) and/or disbursement rules (e.g., specifying a distribution of proceeds from any sale, disbursement, or re-allocation of the connected device).

Further, in additional aspects, system 140 may encrypt the modified list of event triggers and rules engine using any of the exemplary techniques described above, and may store the encrypted and updated list of event triggers and rules engine in a locally accessible data repository In some aspects, and as described above, system 140 may transmit portions of the data identifying user 110, the connected device, and the purchase to one or more of peer systems 160, along with the encrypted and updated list of event triggers and rules engine. In other aspects, client device 110 may transmit portions of the packaged input data directed to one or more of peer system 160, e.g., as an alternate to or in addition to the transmission of the packaged input data to system 140. Peer systems 160 may, using any of the exemplary techniques described above, competitively process the received data portions, the encrypted rules engine, and the encrypted list of event triggers to generate one or more blocks of a hybrid, blockchain ledger data structure that establishes user 110's ownership of the connected device, the one or more conditions that would trigger a sale, transfer, or re-allocation of user 110's ownership interest, and further, the one or more rules that enable systems 140 to distribute proceeds from the sale, transfer, or re-allocation.

In certain aspects, as described above, one or more of peer systems 160 may act as "miners" for the asset-specific, hybrid, blockchain ledger, and may competitively process the packaged data (either alone or in conjunction with other data) to generate a new ledger block, which may be appended to the vehicle-specific, hybrid blockchain ledger to record and establish user 110's ownership interest in the connected vehicle. In certain aspects, and as described above, the new ledger block (e.g., as generated by peer systems 160 through competitive mining) may include information that identifies user 110 (e.g., full name, address, etc.) and the connected device (a model, a manufacturer, a year of manufacture, a MAC address, an IP address, etc.), and the purchase (e.g., the purchase price, the retailer, etc.). The asset-specific, hybrid blockchain ledger, updated to include the new ledger block, may be distributed across peer systems 160 (e.g., through a peer-to-peer network) and to other devices and systems operating within environment 100, including system 140).

Further, the asset-specific, hybrid, blockchain ledger data structure (to which the new ledger block is appended) may also include usage data repositories that, for example, track an evolution of a location, usage, performance, and/or status of the connected device throughout user 110's ownership. In some aspects, the usage data repositories may be incorporated within blocks of the hybrid, blockchain ledger data structure in unencrypted format (e.g., usage data repository 518 of FIG. 5B) or alternatively, may be encrypted via user 110's private crypto key (e.g., one of usage data repositories 604A and 604B of FIG. 6). The disclosed embodiments are, however, not limited to usage data repositories included within corresponding blocks of the exemplary hybrid, blockchain ledger data structures described above, and in further aspects, a usage data repository for the connected device (e.g., usage data repository 508 of FIG. 5A) may be stored locally on device 104, within a data repository of systems 140, 141, and/or 145, and further, in any addition or alternate location (e.g., cloud storage) accessible across network 120.

In certain aspects, the disclosed embodiments may incorporate, into the usage data repositories, data indicative of a location, one or more performance characteristics, one or more usage characteristics, and/or an operational state of the connected device captured by integrated and/or external sensor devices at discrete points in time or during predetermined temporal intervals. For example, and as described above, the connected device may include one or more integrated sensor devices and additionally or alternatively, may operate within a network of external sensor devices administered by a sensor-network computer system (not depicted in FIG. 1). The integrated and/or external sensor devices may be capable of detecting, among other things, a location of the connected device, usage characteristics (e.g., a current mileage of a connected vehicle, a number of hours a user operated the connected device, a data consumption of the connected device, etc.), performance characteristics (e.g., characteristics of a connected vehicle's performance, such as engine temperature, fuel-air mixture, emission characteristics, etc.), status (e.g., data indicative of whether scheduled maintenance is required, whether an operating system is up-to-date, a cracked screen or a number of events indicative of drops or collisions, etc.). Further, the one or more external sensor devices may be capable of determine a presence of the connected vehicle at one or more particular locations, such as toll plazas, dealer service centers, parking garages, etc., based on a detection of a RF transponder or other communications device associated with the connected device.

The disclosed embodiments are, however, not limited to any particular type of quantity of integrated and external sensor devices. In further embodiments, a location, performance, usage, and/or status of the connected device (and any other asset by user 110 and tracked within hybrid, blockchain) may be detected by any additional or alternate type or quantity of integrated or external sensors appropriate to the connected device (or tracked asset) and compatible with the devices and systems operating system environment 100.

In some aspects, a processor (or processing unit) integrated into the connected device may execute one or more software applications to obtain the captured sensor data (e.g., the location, performance, usage, status, and/or condition data described above). Similarly, an external computer system associated with the external sensor network may be communicatively coupled to the one or more external sensor devices operating within the external sensor network (e.g., to sensor network 504 across network 120 or using peer-to-peer communication protocols, such as near-field communication (NFC) protocols), and may execute one or more software applications to obtain the captured sensor data from at least a subset of the external sensor devices that monitor the connected vehicle within environment 100.

In some embodiments, the integrated processor and/or the external computing system may execute software applications to classify the captured sensor data in accordance with various parameters, which include, but are not limited to, a data type, a currency of the captured sensor data (i.e., relating to a current state of the connected device), as association of the captured sensor data to user 110's intentions or culpability (e.g., the captured sensor data resulted from an intended activity of user 110 and additionally or alternatively, an unintended or unforeseen action). In certain aspects, the integrated processor and/or the external computing system may package the classified sensor data into corresponding data structures for storage in one or more accessible memories.

Additionally, and in some embodiments, the integrated processor and/or the external computing system may augment the captured and classified sensor data with metadata that characterize the internal or external sensors, the sampling of these sensors, and the disposition of other monitored devices within environment 100. In some instances, the integrated processor and/or the external computing system may store the metadata in conjunction with corresponding portions of the classified sensor data within the one or more accessible memories or storage devices.

For example, the classified sensor data portions may be augmented within elements of metadata that include, but are not limited to, timestamps associated with particular elements of sensor data, identifiers of sensor devices that captured the particular elements of sensor data (e.g., MAC addresses, IP addresses, network locations within the external sensor network, etc.), a time period during which one or more of the integrated or external sensor devices monitored the connected device, locations of corresponding ones of the integrated or external sensor devices, an IP address of the external sensor network and/or the external computer system, and identifiers of additional connected devices (e.g., connected devices 502) monitored by the integrated or external sensor devices and proximate to the connected vehicle at the corresponding timestamps. The disclosed embodiments are, however, not limited to these exemplary sensor data classifications and metadata types, and in other embodiments, the integrated processor and/or the external computing system may classify the captured sensor data in accordance with any additional or alternate relevant classification, and may augment the classified sensor data with any additional or alternate metadata appropriate to the connected device, the integrated and/or external sensor devices, and the captured sensor data.

The integrated processor and/or the external computing system may, in some aspects, transmit portions of the classified sensor data and additionally or alternatively, corresponding portions of the metadata, to one or more of peer systems 160 (e.g., in accordance with a schedule established by user 110 and recorded in the list of event triggers). As described above, peer systems 160 may competitively process the classified sensor data, either alone or in conjunction with the corresponding metadata, to generate a new ledger block, which may be appended to the hybrid, blockchain ledger data structures for the connected vehicle, and which may be distributed across peer systems 160 (e.g., through a peer-to-peer network) and to other devices and systems operating within environment 100.

In certain aspects, one or more of peer systems 160 may incorporate the classified sensor data (either alone or augmented with the corresponding metadata) as a "transaction" into the new ledger block upon receipt from the integrated processor and/or the external computing system. In other aspects, one or more of peer systems 160 may batch the classified sensor data (either alone or augmented with the corresponding metadata), and incorporate the batched sensor data and corresponding batched metadata as a "transaction" into the new ledger block in accordance with a predetermined schedule (e.g., hourly, daily, weekly, etc.).

In some aspects, the new ledger block may encrypt the incorporated sensor data and/or the corresponding metadata using a private crypto key of user 110 (e.g., encrypted metadata repository 612A and/or encrypted data repository 614A). The encryption of the sensor data and/or the corresponding metadata may, in some aspects, authenticate the usage data for various business entities that rely on the usage data to inform decisions on valuation, risk, and financing. In other instances, the sensor data and/or the corresponding metadata may incorporated into the new ledger block in unencrypted form (e.g., usage data repository 518) to facilitate public access and review of the connected device's usage data. Further, in additional embodiments, integrated processor and/or the external computing system may transmit portions of the classified sensor data and additionally or alternatively, corresponding portions of the metadata to one or more additional devices and systems within environment 100 (e.g., device 104 and/or system 140) which may incorporate the portions of classified sensor data and/or metadata within locally accessible usage data repositories (e.g., usage data repository 508).

Further, in some aspects, one or more of peer systems 160 may access a prior block of the asset-specific hybrid, blockchain ledger data structure that tracks the ownership of the connected device, and may access and encrypted list of event triggers (e.g., event triggers list 322) and an encrypted rules engine (e.g., rules engine 324), which peer systems 160 may hash into the new ledger block using any of the exemplary techniques described above. In other aspects, and as described above, one or more of peer systems 160 may receive, from system 140, encrypted data corresponding to an updated list of event triggers and an update rules engine, which peer systems 160 may hash into the new ledger block using any of the exemplary techniques described above.

For example, the list of triggering events may include events that would trigger a generation of a new ledger block, such as a receipt of captured sensor data (and corresponding metadata) and activity reflective of a change in an ownership interest in the connected device, including, but not limited to, a sale, a transfer of an ownership interest, an attachment of a lien to a particular ownership stake, and a release of the an attached lien. Further, and described above, the list of triggering events may further identify one or more triggering conditions that, upon detection by system 140, would cause system 140 to perform operations that initiate a sale, transfer, and/or a re-allocation of user 110's ownership interest in the connected device. The one or more triggering conditions may include, but are not limited to, a temporal condition (e.g., a two-year ownership period) and/or a usage condition (e.g., a threshold number of hours of usage and/or a threshold amount of transmitted data) that would trigger the sale, transfer, or re-allocation of user 110's ownership interest in the connected device The list of triggering events may also include one or more of the reconciliation events described above, which may specify a schedule by which the connected device checks-in with system 140).

Rules engines consistent with the disclosed embodiments may, in some aspects, initiate a generation of a new data block in response to a detected change in ownership and/or in response to the received sensor data and/or metadata. Additionally or alternatively, the rules engine may include rules that facilitate implementation and/or provision of the ownership rights and obligations allocated to user 110, including, but not limited to, a disbursement of proceeds from a sale of the connected device, and further, an initiation processes to electronically transfer portions of the proceeds to recipients (e.g., through the disbursement rules described above). For example, the disbursement rule may identify, among other things, portions of the proceeds allocated to particular individuals and to corresponding financial services accounts (e.g., as identified by corresponding account numbers, routing numbers, and financial institution data). In other aspects, and as described above, the rule engine may also include one or more reconciliation rules that, among other things, specify one or more operations performable by system 140 when the connected device fails to establish communications in accordance with the specified schedule (e.g., operations that notify user 110 of any non-compliant devices).

In further instances, as described above, system 140 may operate as a rules authority, and may execute software instructions to decrypt a rules engine and/or an event trigger list included within an updated version of the hybrid private-public ledger data structure that tracks the ownership of the connected device (i.e., the latest, longest hybrid private-public ledger) using any of the exemplary techniques described above. For example, system 140 may modify or augment a portion of the decrypted rules engine and/or event triggers list to incorporate additional data received from client device 104, which may specify additional or modified reconciliation rules, triggering conditions, and disbursement rules. System 140 may, in some aspects, encrypt the modified rules engine and/or event triggers list using any of the exemplary techniques described above, and provide the encrypted, but modified, rules engine and/or event triggers list to peer systems 160 for incorporation into the new ledger block of the hybrid private-public ledger data structure. The disclosed embodiments are, however, not limited to these exemplary reconciliation events and rules, triggering conditions, and disbursement rules, and in additional embodiments, and as described below, the list of triggering events and rules engine may include any additional or alternate events and rules appropriate to user 110 (or other owner), the connected device, and to system 140.

In some aspects, peer systems 160 may access the updated version of the asset-specific, hybrid private-public ledger data structure that tracks the ownership of the connected device (i.e., the latest, longest hybrid private-public ledger), and process a final block of that data structure to access the event trigger list and rules engine, which may be hashed into the new ledger block using any of the exemplary techniques described above. In some aspects, when user 110 purchases a "new" connected device, the updated version of that asset-specific hybrid private-public ledger data structure may include only a genesis block, which may be generated by a manufacturer of the connected device using any of the techniques outlined above. By establishing and maintaining the hybrid private-public ledger data structure based on a genesis block generated by the manufacturer of the connected device, the disclosed embodiments may enable one or more devices and systems operable within environment 100 to track an evolution of an ownership and/or usage of the connected vehicle throughout its lifecycle.

Further, and by way of example, the new ledger block generated by peer systems 160 may include, among other things: a block header (which identifies an address of a prior block); an identifier of the corresponding one or peer systems 160 that created the additional ledger block; a rules header that identifies the integrated and/or external sensor devices and includes a rules associate key (e.g., that associates a rule to the Internet-connected device); an encrypted list of event triggers and an encrypted rules engine; a header for the received transaction data; and the received transaction data written into the hybrid, blockchain data structure.

Further, and as described above, peer systems 160 may include data identifying the integrated and/or external sensor devices within a rules header of the additional ledger block, which may provide the rules engine with a mapping of all connected sensor devices, both integrated into the Internet-connected device and operating within the external sensor network. Additionally, peer systems 160 may write the transaction data into the additional ledger block as HEX, Unicode, a combinations of the two, and/or any additional or alternate encoding suitable for the transaction data and the new ledger block.

b. Exemplary Processes for Reconciling Tracked Assets and Distributing Proceeds from Sales, Transfers, and Re-Allocations of Tracked Assets Using Hybrid Blockchain Ledgers As described above, peer systems 160 may append the new ledger block to the existing hybrid, blockchain ledger data structure for the connected device (e.g., to generate an updated hybrid, blockchain ledger data structure), which may be distributed across peer systems 160 (e.g., through a peer-to-peer network) and to other devices operating environment 100 (e.g., across network 120). In certain aspects, system 140 may access the updated hybrid, blockchain ledger data structure, which include the new ledger block, and additionally or alternatively, additional ledger blocks confirming a location, usage, performance, and/or status of the connected device, and based on portions of the updated hybrid, blockchain ledger data structure, determine the connected device's compliance with one or more reconciliation events and conditions.

For example, system 140 may execute software applications to access the updated hybrid, blockchain ledger data structure for the connected device (e.g., as stored in data repository 144 and/or as received from one or more of peer systems 160), and may extract ledger blocks that include data indicative of the location, usage, performance, and/or status of the connected device on Nov. 1, 2015, at 12:00 p.m. Using any of the exemplary techniques described above, system 140 may also access and decrypt a list of triggering events (e.g., as stored within data repository 144 or as obtained from the updated hybrid, blockchain ledger data structure), which may specify that the connected device establish communications with system 140 at 12:00 p.m. on November 2, and further, transmit captured sensor data indicative of a current location, usage, performance, and/or status to one or more of peer systems 160 for inclusion in a new data block, as described above.

In some aspects, at 12:01 p.m. on Nov. 2, 2015, system 140 may execute software applications that detect a failure of the connected device to establish communications at the scheduled time (e.g., by transmitting a check-sum data packet across data network 120 to system 140). Further, based on the extracted data blocks, system 140 may determine that the connected device last provided its current location, usage, performance, and/or status on Nov. 1, 2015, at 12:00 p.m., and accordingly, system 140 may determine that the connected device failed to comply with the specified communications schedule and may establish the connected device as non-compliant (and store data indicative of the non-compliance in data repository 144).

In certain aspects, and based on the data indicative of the connected device's non-compliance, system 140 may access and decrypt an encrypted rules engine (e.g., as stored in data repository 144 and/or as obtained from the updated hybrid, blockchain ledger data structure), and may identify one or more reconciliation rules that specify operations that system 140 may perform in response to the non-compliant connected device. For example, the reconciliation rules may specify that system 140 provide a notification to one or more owners of the non-compliant connected device (e.g., user 110) and further, provide data to one or more peer systems identifying the non-compliant connected device, user 110, and further, the operations performed by system 140 to mediate the non-compliance.

In some aspects, and in accordance with the accessed reconciliation rules, system 140 may generate notification data identifying user 110, the non-compliant connected device, and a nature of the non-compliance (e.g., a failure of the connected device to establish communications on Nov. 2, 2015, at 12:00 p.m.). System 140 may transmit the generated notification data to client device 104 across network 120, and client device 102 may be configured to render the received notification data for presentation to user 110 within a corresponding web page, GUI, or pop-up window. In some aspects, the presented notification may identify the non-compliant device and the nature of the non-compliance, and may prompt user 110 to check on the status of the connected device. Further, in additional aspects, system 140 may execute software applications that transmit portions of the generated notification data to one or more of peer systems 160 for inclusion in a new ledger block of the updated hybrid, blockchain ledger data structure for the connected device (e.g., using any of the exemplary techniques described above). Further, and as described below in FIG. 7, system 140 may access portions of the hybrid, blockchain ledger data structure for the connected device, identify occurrences of one or more events that would cause a sale, transfer, or re-allocation of user 110's ownership interest in the connected device, and further, initiate the sale, transfer, and/or re-allocation of user 110's ownership interest in accordance with one or more rules set forth in the rules engine.

Figure 7:
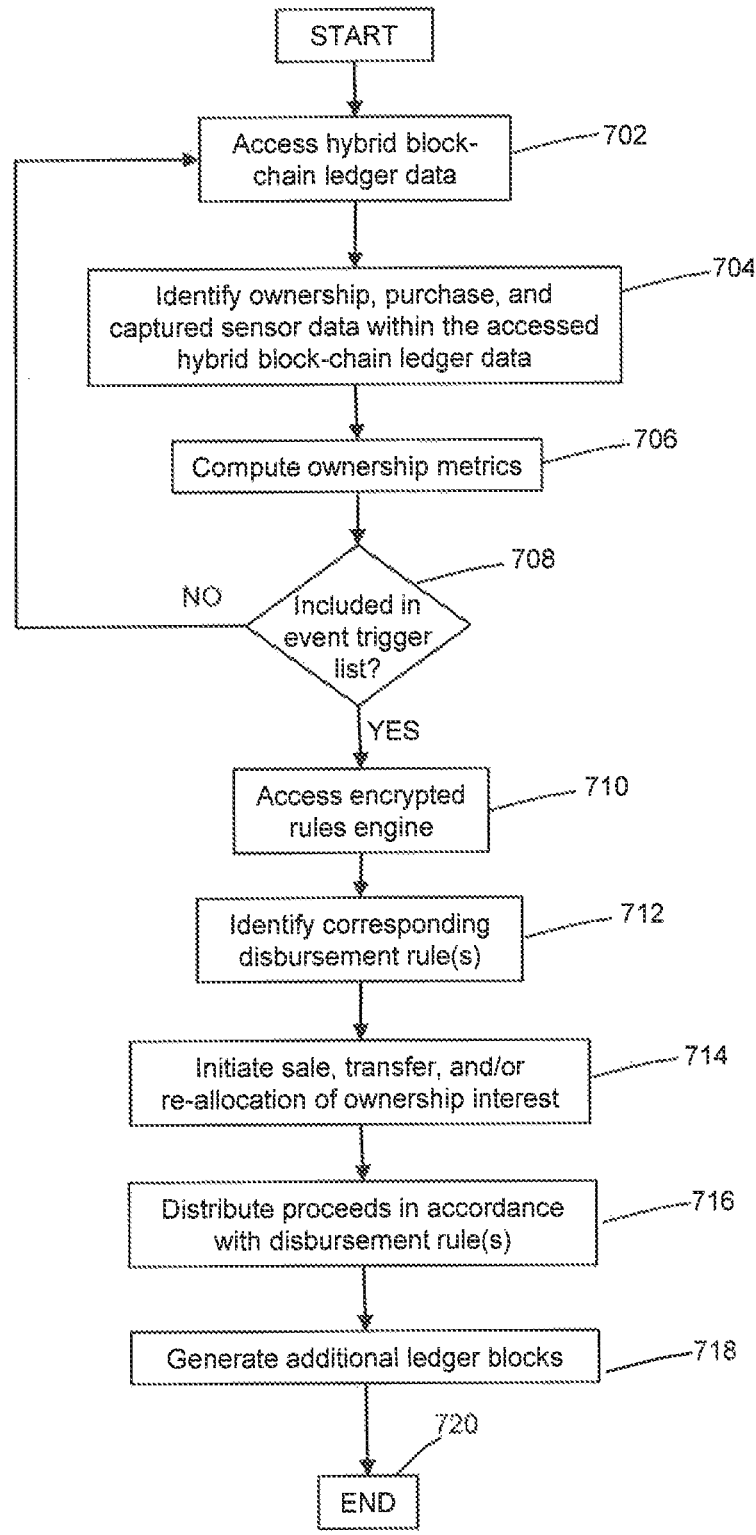
FIG. 7 is a flowchart of an exemplary process for performing operations in response to events tracked within a hybrid blockchain ledger, consistent with the disclosed embodiments.

FIG. 7 is a flowchart of an exemplary process 700 for automatically performing operations in response to events tracked within a hybrid blockchain ledger, in accordance with disclosed embodiments. In an embodiment, a centralized asset inventory system (e.g., as established and maintained by system 140) may execute software applications that access one or more one or more hybrid blockchain ledgers tracking an ownership interest held by one or more owners (e.g., user 110) in a particular asset (e.g., a connected device, as described above). System 140 may, in certain aspects, detect an occurrence of an event or condition triggering a sale, transfer, and/or re-allocation of user 110's ownership interest in the connected device, and in response to the detect occurrence, perform operations that initiate the sale, transfer, and/or re-allocation of the connected device and that disburse proceeds derivative of that sale, transfer, and/or re-allocation in accordance with one or more disbursement rules included in a corresponding rules engine.

In certain aspects, system 140 may execute software applications that access data corresponding to one or more stored hybrid blockchain ledger data structures (e.g., in step 702), and further, that parse discrete blocks of the accessed hybrid blockchain ledger data to identify data indicative of user 110's ownership interest in and purchase of the connected device (e.g., a purchase date, a purchase amount, etc.), and additionally or alternatively, to identify data indicative of a most current location, usage, performance, and/or status of the connected device (e.g., in step 704). As described above, the current location, usage, performance, and/or status data may include sensor data captured by integrated and/or external sensor devices, and the current location, usage, performance, and/or status data may augmented by metadata identifying, among other things, a time at which the integrated and/or external sensor devices captured the data. Further, and by way of example, system 140 may obtain the one or more hybrid blockchain ledger data structures from one or more of peer system 160, and may store data corresponding to the hybrid blockchain ledger data structures within an accessible data repository (e.g., data repository 144 and/or a network accessible cloud-based storage).

System 140 may, in some aspects, execute software applications that derive one or more metrics indicative of user 110's ownership of the connected device from the accessed data (e.g., in step 706). For example, system 140 may determine a cumulative ownership period indicative of a total time that user 110 owned the connected device, and additionally or alternatively, one or more cumulative usage metrics indicative of, among other things, a total time that user 110 operated the connected device since purchase, a total accrued mileage of a connected vehicle since purchase by user 110, and/or a total amount of data accessed by the connected device since purchase by user 110. The disclosed embodiments are, however, not limited to these exemplary ownership metrics, and in additional embodiments, system 140 may compute any additional or alternate ownership metric appropriate to the connected device and derivable from the accessed data.

In some aspects, system 140 may access the stored list of triggering events (e.g., event trigger list 322, as maintained within database 144), and determine whether the derived ownership metrics and/or the accessed data indicate an occurrence of an event triggering a sale, transfer, and/or re-allocation of user 110's ownership interest in the connected device (e.g., in step 708). If system 140 were to determine that the derived ownership metrics and/or the accessed data trigger the sale, transfer, and/or re-allocation of user 110's ownership interest in the connected device (e.g., step 708; YES), system 140 may decrypt and access the encrypted rules engine in step 710 (e.g., using the master encryption key), and further, may identify at least one disbursement rule specifying the sale, transfer, and/or re-allocation of user 110's ownership interest and a distribution of proceeds from the sale, transfer, and/or re-allocation (e.g., in step 712).

For example, the stored list of triggering events may include a temporal condition triggering a sale of the connected device after two years of ownership by user 110. In certain aspects, system 140 may determine that user 110's ownership period includes two years and sixteen days (e.g., in step 706), which system 140 may determine represents an event triggering a sale, transfer, and/or re-allocation of user 110's ownership interest in the connected device (e.g., step 708; YES). Further, system 140 may be configured to access the encrypted rule engine using any of the exemplary techniques described above (e.g., using master key 301), and identify disbursement rules associated with the temporal condition that specify a sale of the connected device to a third party, a distribution of 50% of the proceeds of the sale in a first financial services account held by user 110 (e.g., a savings, checking, and/or investment account), and a distribution of 50% of the proceeds into an account associated with one or more merchants, which may apply the allocated proceeds to a purchase of an additional connected device (e.g., in steps 710 and 712).

System 140 may, in certain aspects, perform operations that initiate the sale, transfer, or re-allocation of user 110's ownership interest in the connected device in accordance with the accessed disbursement rules (e.g., in step 714). For instance, and as described above, system 140 may perform operations that initiate a sale of the connected device to the third party (e.g., through a call to an appropriate API associated with one or more computer systems and servers maintained by the third party and/or an e-commerce retailer). Upon completion of the sale and upon receipt of the proceeds from the third party (e.g., as an electronic transfer of funds from an account held by the third party), system 140 may perform operations that distribute the proceeds in accordance with the disbursement rules (e.g., in step 716). For example, and as described above, system 140 may execute software applications that initiate a first electronic transfer of 50% of the proceeds to the financial services account held by user 110, and a second electronic transfer of 50% of the proceeds to the financial services account held by the one or more merchants, in accordance with the accessed disbursement rules.

In some instances, system 140 may perform operations that generate one or more additional ledger blocks of the accessed hybrid blockchain ledger data structures to record that transfer of ownership from user 110 to the third party and further, to memorialize the disbursement of the proceeds of the sale in accordance with the accessed disbursement rules (e.g., in step 718). For example, system 140 may generate transaction data that identifies the sale of the connected device (e.g., a purchase price, a purchase date, etc.) and the third-party (e.g., a full name of the third party, etc.), and may transmit the generated transaction data to one or more of peer systems 160, which may incorporate the transaction data into an additional ledger blocks of the accessed hybrid blockchain ledger data structures using any of the exemplary techniques described above. Further, in some instances, system 140 may generate transaction data indicative of the disbursement of the proceeds of the sale of the connected device, portions of which may be transmitted to one or more of peer systems 160 for inclusion in an additional block of the accessed hybrid blockchain ledger data structures, as described above. Exemplary process 700 is then complete in step 720.

Referring back to step 708, if system 140 were to determine that the derived ownership metrics, provided documents, and/or the accessed data do not trigger the sale, transfer, and/or re-allocation of user 110's ownership interest in the connected device (e.g., step 708; NO), exemplary process 700 may pass back to step 702, and system 140 may continue to access and monitor the one or more hybrid blockchain ledger data structures associated with the connected device, as described above.

In some embodiments, the exemplary hybrid blockchain ledger data structures may enable one or more devices and systems operating within environment 100 to track an evolution in an ownership and usage of the connected device throughout its lifecycle castrating from manufacture. Further, the exemplary hybrid blockchain ledger data structures may enable a centralized asset inventory system, acting as a rules authority, to reconcile one or more connected devices that collectively represent an inventory held by one or more owners (e.g., user 110 and/or business entity 150), to detect occurrences that trigger a sale, transfer, and/or re-allocation of at least a portion of the held connected devices, and further, to initiate and distribute proceeds derives from the sale, transfer, and/or re-allocation in accordance with disbursement rules established by the one or more owners.

Further, although described above specify particular temporal conditions, reconciliation events and rules, and disbursement rules, the disclosed embodiments are not limited to these exemplary temporal conditions, reconciliation events and rules, and disbursement rules. In further embodiments, user 110 and/or business entity 150 may specify any additional or alternate event triggering inventory reconciliation and/or a sale, transfer, and/or re-allocation of ownership interests that would be appropriate to the owners, the connected device, and system 140 and trackable within the exemplary hybrid blockchain ledger data structures. Similarly, user 110 and/or business entity 150 may specify any additional or alternate reconciliation and disbursement rules appropriate to the connected device, the owners, and to system 140, which performs operation consistent with these reconciliation and disbursement rules.

Further, in the embodiments described above, the exemplary tracked assets include a single connected device, such as a connected vehicle. The disclosed embodiments are not limited to processes that track single assets, and in further embodiments, the exemplary hybrid blockchain ledger data structures may track an evolution of ownership of groups of particular assets (e.g., groups of connected office products collectively owned by business entity 150), and the disclosed processes may enable inventory reconciliation in any subset of the group of particular assets, and a sale, transfer, and/or re-allocation of ownership interests (and a distribution resulting proceeds) in any subset of these particular assets. Thus, the disclosed processes, which describe a single connected device, may be applied to reconcile, sell, and or distribute proceeds from a sale of any asset within with these subsets.

Additionally, the disclosed embodiments are not limited to processes that track a time-evolution of ownership of various connected devices operating within environment 100, and that automatically reconcile ownership and/or distribute proceeds from sales, transfers, and or re-allocations of ownership interests based on corresponding established rules and triggering events. In additional embodiments, the exemplary hybrid blockchain ledger data structures may track an evolution of ownership of various financial instruments having specified beneficiaries, and may distribute ownership of these financial interests in accordance with a testamentary intent of an owner memorialized within a corresponding rules engine. For example, user 110 may own a life insurance policy issued by a financial institution (e.g., business entity 150 that maintains system 1400, which may name user 110's spouse as a beneficiary. Using any of the exemplary techniques described above, user 110 may establish the life insurance policy as the tracked asset, may establish a death of user 110 as a condition triggering disbursement of the proceeds, and establish one or more rules directing a distribution of the proceeds to user 110's spouse.

As described above, the exemplary hybrid blockchain ledger data structures may track an evolution of ownership of the life insurance policy, may establish user 110's death as a triggering event within an encrypted list of event triggers, and may establish, within the encrypted rules engine data, one or more disbursement rules specifying the distribution of the proceeds of the life insurance policy to user 110's spouse in the event of user 110's death. In certain aspects, and upon user 110's death, the spouse may present the financial institution with a death certificate (e.g., as issued by an appropriate governmental agency), which may be provided as input to system 140 using a device held by a representative of the financial institution, and which system 140 may recognize as an event triggering a distribution of the proceeds of the life insurance policy to the spouse using any of the exemplary techniques described above. Further, upon user 110's death, an Internet-of-Things (IoT) connected sensor, in conjunction with connected instrumentation, may trigger an event that may be confirmed by further documentation to distribute the proceeds of the life insurance policy to the defined beneficiaries using any of the exemplary techniques described above. Further, in certain disclosed embodiments, peer systems 160 represent a public, de-centralized network of "miners" that competitively generate new blocks hybrid blockchain ledgers data structures based on "transaction data" received from various computing systems and devices across network 120 (e.g., system 140 and/or device 104). In other aspects, and consistent with the disclosed embodiments, system 140, maintained and acting on behalf of a rules authority (e.g., a financial institution) may establish, maintain, and distribute one or more the hybrid blockchain data structures using any of the exemplary processes described above. In some aspects, system 140 may establish and maintain the exemplary the hybrid blockchain data structures to track an ownership of devices and systems operating within a closed enterprise (e.g., computing devices assigned to employees within a large business enterprise).

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
at least one processor; and
a memory storing executable instructions that, when executed by the at least one processor, causes the at least one processor to perform the steps of:
  obtaining, from the memory, a data block of a blockchain ledger, the data block comprising a first data portion, a second data portion, and information associated with at least one asset, the at least one asset comprising a connected device;
  obtaining a master cryptographic key associated with a rules authority from a secure data repository accessible to the apparatus;
  decrypting the first data portion using a private cryptographic key associated with the connected device, and decrypting the second data portion using the master cryptographic key associated with the rules authority;
  identifying a plurality of events based on the decrypted first data portion, and identifying a plurality of rules associated with the plurality of events based on the decrypted second data portion;
  detecting, based on the information and on the decrypted first data portion, an occurrence of a first one of the plurality of events associated with the connected device;
  identifying, based on the decrypted second data portion, at least one of the plurality of rules that is associated with the first one of the plurality of events;
  based on the identified at least one of the plurality of rules, generating a first electronic command that initiates a transfer of an ownership interest in the connected device from a first party to a second party; and
  generating an additional data block of the blockchain ledger, the additional data block comprising the first data portion, the second data portion, and at least one parameter value of the transfer.

2. The apparatus of claim 1, wherein the at least one processor further executes the instructions to perform the step of generating a second electronic command that initiates a disbursement of funds from a first account of the first party to a second account of the second party in accordance with the at least one of the plurality of rules.

3. The apparatus of claim 1, wherein:
the at least one processor further executes the instructions and performs the steps:
receiving data from a device associated with the first party;
modifying the decrypted second data portion based on at least a portion of the received data;
encrypting the modified second data portion using the master cryptographic key of the rules authority; and
the additional data block of the blockchain ledger further comprises the encrypted modified second data portion.

4. The apparatus of claim 1, wherein:
the at least one processor further executes the instructions to perform the steps of:
receiving data associated with at least one second event of the plurality of events;
modifying the decrypted first data portion based on at least a portion of the received data;
encrypting the modified first data portion using the master cryptographic key associated with the rules authority;
the additional data block further comprises the encrypted modified second first data portion.

5. The apparatus of claim 1, wherein the information further comprises a transaction date associated with a prior transfer of the ownership interest in the connected device to the first party.

6. The apparatus of claim 5, wherein the at least one processor further executes the instructions to perform the steps of:
obtaining, from the decrypted first data portion, a temporal condition associated with the connected device, the temporal condition comprising a threshold time period;
establishing, based on the transaction date, a time period associated with the ownership interest of the first party in the connected device;
determining that the established time period exceeds the threshold time period; and
detecting the occurrence of the first one of the plurality of events in response to the determination that the established time period exceeds the threshold time period.

7. The apparatus of claim 5, wherein the at least one processor further executes the instructions to perform the steps of:
obtaining, from the decrypted first data portion, a usage condition associated with the connected device, the usage condition comprising a threshold value of a usage parameter of the connected device;
based on the information, compute a value of the usage parameter during a corresponding time period;
determining that the computed value of the usage parameter exceeds the threshold value during the corresponding time period; and
detecting the occurrence of the first one of the plurality of events in response to the determination that the computed value of the usage parameter exceeds the threshold value.

8. The apparatus of claim 1, wherein:
the private cryptographic key associated with the connected device comprises a private cryptographic key of the first party or a private cryptographic key of the second party.

9. The apparatus of claim 1, wherein:
the at least one processor further executes the instructions to perform the step of
generating the additional data block in accordance with the at least one of the plurality of rules associated with the first one of the plurality of events;
the at least one parameter value comprises a value characterizing the ownership interest, a first identifier of the first party, or a second identifier of the second party.

10. The apparatus of claim 1, wherein the at least one processor further executes the instructions to perform the steps of:
transmitting the additional data block to one or more peer computing systems;
receiving at least a portion of an additional blockchain ledger that includes the additional data block from at least one of the one or more peer computing systems, and storing the portion of the additional blockchain ledger within the memory.

11. The apparatus of claim 1, wherein the at least one processor further executes the instructions to perform the steps of:
generating an additional blockchain ledger that includes the additional data block; and
storing the additional blockchain ledger within the memory.

12. The apparatus of claim 1, wherein the at least one processor further executes the instructions to perform the steps of:
detecting an occurrence of a second one of the plurality of events based on the information and on the decrypted first data portion, and identifying an additional one of the plurality of rules associated with the second one of the plurality of events based on the decrypted second data portion; and
based on the detected occurrence of the second one of the plurality of events, generate and transmit notification data to a device of the first party.

13. The apparatus of claim 12, wherein:
the second one of the plurality of events comprises a non-compliance of the connected device with a communications schedule; and
the notification data comprises a portion of the communications schedule associated with the non-compliance.

14. The apparatus of claim 1, wherein:
the at least one processor further executes the instructions to perform the steps of:
obtaining, from the memory, the private cryptographic key associated with the connected device;
encrypting the at least one parameter value using the private cryptographic key; and
the additional data block comprises the at least one encrypted parameter value.

15. The apparatus of claim 1, wherein the at least one processor further executes the instructions to perform the steps of:
generating the master cryptographic key; and
storing the master cryptographic key within a portion of the secure data repository.

16. A computer-implemented method, comprising:
obtaining, by at least one processor, from a data repository, a data block of a blockchain ledger, the data block comprising a first data portion, a second data portion, and information associated at least one asset, the at least one asset comprising a connected device;

obtaining, by at least one processor, a master cryptographic key associated with a rules authority from a secure data repository;

decrypting, by the at least one processor, the first data portion using a private cryptographic key associated with the connected device, and decrypting the second data portion using the master cryptographic key associated with the rules authority;

identifying, by the at least one processor, a plurality of events based on the decrypted first data portion, and identifying a plurality of rules associated with the plurality of events based on the decrypted second data portion;

detecting, by the at least one processor, and based on the information and on the decrypted first data portion, an occurrence of a first one of the plurality of events associated with the connected device;

identifying, by the at least one processor, and based on the decrypted second data portion, at least one of the plurality of rules that is associated with the first one of the plurality of events;

based on the identified at least one of the plurality of rules, generating by the at least one processor, a first electronic command that initiates a transfer of an ownership interest in the connected device from a first party to a second party; and generating, by the at least one processor, an additional data block of the blockchain ledger, the additional data block comprising the first data portion, the second data portion, and at least one parameter value of the transfer.

17. The method of claim 16, wherein the method further comprises generating a second electronic command that initiates a disbursement of funds from a first account of the first party to a second account of the second party in accordance with the at least one rule of the plurality of rules.

18. The method of claim 16, further comprising:
receiving data from a device associated with the first party;
modifying the decrypted second data portion based on at least a portion of the received data; and
encrypting the modified second data portion using the master cryptographic key of the rules authority,
wherein the additional data block further comprises the encrypted modified second data portion.

19. The method of claim 16, further comprising:
receiving data associated with at least one second triggering event;
modifying the decrypted first data portion based on at least a portion of the received data; and
encrypting the modified first data portion using the master cryptographic key associated with the rules authority,
wherein the additional data block further comprises the encrypted modified first data portion.

20. The method of claim 16, wherein the information comprises a transaction date associated with a prior transfer of the ownership interest in the connected device to the first party.

21. The method of claim 20, further comprising
obtaining, from the decrypted first data portion, a temporal condition associated with the connected device, the temporal condition comprising a threshold time period;

establishing, based on the transaction date, a time period associated with the ownership interest of the first party in the connected device;
determining that the established time period exceeds the threshold time period; and
detecting the occurrence of the first one of the plurality of events in response to the determination that the established time period exceeds the threshold time period.

22. The method of claim 20, further comprising
obtaining, from the decrypted first data portion, a usage condition associated with the connected device, the usage condition comprising a threshold value of a usage parameter of the connected device during a corresponding time period;
based on the information, computing a value of the usage parameter of the connected device during a corresponding time period;
determining that computed value of the usage parameter exceeds the threshold value during the corresponding time period; and
detecting the occurrence of the first one of the plurality of events in response to the determination that the computed value of the usage parameter exceeds the threshold value.

23. A tangible, non-transitory computer-readable medium having storing software instructions that, when executed by at least one processor, cause the at least one processor to perform a method, comprising:
obtaining, from a data repository, a data block of a blockchain ledger, the data block comprising a first data portion, a second data portion, and information associated with at least one asset, the at least one asset comprising a connected device;
obtaining a master cryptographic key associated with a rules authority from a secure data repository;
decrypting the first data portion using a private cryptographic key associated with the connected device, and decrypting the second data portion using the master cryptographic key of the rules authority;
identifying a plurality of events based on the decrypted first data portion, and identifying a plurality of rules associated with the plurality of events based on the decrypted second data portion;
detecting, based on the information and the decrypted first data portion, an occurrence of a first one of the plurality of events associated with the connected device;
identifying, based on the decrypted second data portion, at least one of the plurality of rules that is associated with the first one of the plurality of events;
based on the identified at least one of the plurality of rules, generating an electronic command that initiates a transfer of an ownership interest in the connected device from a first party to a second party; and
generating an additional data block of the blockchain ledger, the additional data block comprising the first data portion, the second data portion, and at least one parameter value of the transfer.

* * * * *